(12) United States Patent
Fujiune

(10) Patent No.: US 8,054,720 B2
(45) Date of Patent: Nov. 8, 2011

(54) OPTICAL DISC DEVICE AND LASER POWER CONTROL METHOD

(75) Inventor: Kenji Fujiune, Osaka (JP)

(73) Assignee: Panasonic Corporation, Osaka (JP)

( * ) Notice: Subject to any disclaimer, the term of this patent is extended or adjusted under 35 U.S.C. 154(b) by 2 days.

(21) Appl. No.: 12/675,464

(22) PCT Filed: Apr. 21, 2009

(86) PCT No.: PCT/JP2009/001817
§ 371 (c)(1),
(2), (4) Date: Feb. 26, 2010

(87) PCT Pub. No.: WO2009/130889
PCT Pub. Date: Oct. 29, 2009

(65) Prior Publication Data
US 2010/0246350 A1   Sep. 30, 2010

(30) Foreign Application Priority Data
Apr. 23, 2008   (JP) .................................. 2008-112371

(51) Int. Cl.
G11B 15/52   (2006.01)
(52) U.S. Cl. .................. 369/47.53; 369/53.27; 369/53.3
(58) Field of Classification Search .................. None
See application file for complete search history.

(56) References Cited

U.S. PATENT DOCUMENTS

| 6,418,102 B1 | 7/2002 | Suga |
| 6,487,152 B1 | 11/2002 | Nakamura |
| 6,842,412 B2 | 1/2005 | Ushiyama et al. |
| 2002/0176338 A1 | 11/2002 | Ushiyama et al. |
| 2004/0257940 A1 | 12/2004 | Senga et al. |
| 2007/0217306 A1 | 9/2007 | Suzuki et al. |

FOREIGN PATENT DOCUMENTS

| JP | 2000-200416 | 7/2000 |
| JP | 2001-101660 | 4/2001 |
| JP | 2001-344753 | 12/2001 |
| JP | 2002-352430 | 12/2002 |
| JP | 2002-358642 | 12/2002 |
| JP | 2007-200435 | 8/2007 |
| JP | 2007-280498 | 10/2007 |

OTHER PUBLICATIONS

International Search Report for corresponding application No. PCT/JP2009/001817 dated Jul. 28, 2009.

*Primary Examiner* — Paul Huber
(74) *Attorney, Agent, or Firm* — Renner, Otto, Boisselle & Sklar, LLP

(57) ABSTRACT

An optical disk apparatus according to the present invention generates a divided clock signal by dividing a recording clock signal, and based on the divided clock signal, determines a test emission pattern for test recording which is used for controlling the power of a light beam that is output from an emission section. When the linear velocity at recording changes, the division ratio is adjusted in a direction of reducing a change in frequency of the divided clock signal. In an optical disk apparatus which performs laser power control by conducting a test emission with multipulses in a test area, a good detection accuracy of a multi-pulse average value can be maintained even at high x-speeds.

18 Claims, 15 Drawing Sheets

(a)

(b)

(a)

(b)

(c)

(d)

(a)

(b)

(a)

(b)

US 8,054,720 B2

OPTICAL DISC DEVICE AND LASER POWER CONTROL METHOD

TECHNICAL FIELD

The present invention relates to an optical disk apparatus and a laser power controlling method for recording data by causing a test emission of a laser light source to correct discrepancies in the control of laser power. More specifically, the present invention improves the control accuracy of a peak power of laser light at a high x-speed.

BACKGROUND ART

In a conventional optical disk apparatus, when reproducing data, a light beam of a relatively weak constant light amount is radiated onto an optical disk as an information medium, and reflected light which has been modulated by the optical disk to become more or less intense is detected, thus achieving reproduction. When recording data, the light amount of a light beam is modulated to become more or less intense in accordance with a signal to be recorded, thus writing data to a film of recording material on the optical disk. In a read-only optical disk, information in the form of pits is previously recorded in a spiral form. A write-once or rewritable optical disk is produced by forming a film of material that enables optical recording and reproduction on the surface of a base having a spiral form of tracks with bump-and-dent structure, with a technique such as vapor deposition.

A laser light source is generally employed in forming recording marks on an optical disk. In order to form good recording marks, it is necessary for a laser light source to emit light with a predetermined waveform. In order to form recording spaces, a laser light source is driven to continuously emit light at a constant power for a predetermined time. In order to obtain a stable recording performance, the power of such a laser light source must be accurately controlled. However, the power characteristics of a laser light source are greatly influenced by ambient temperature and the like. Therefore, even if a power is set prior to recording and a constant driving current is supplied, a constant power will not be maintained, and power fluctuations will occur due to an increase in the temperature of the main body of the laser light source or the peripheral devices.

An operation of a conventional optical disk apparatus will be described with reference to FIG. 12, FIG. 13, FIG. 14, and FIG. 15.

FIG. 12 shows an example of an emission waveform from a laser light source at recording. FIG. 13(a) shows a layout of test areas in a DVD-RAM, and FIG. 13(b) shows a layout of test areas in a BD (Blu-ray Disc). Among emission patterns of a laser light source, FIG. 14(a) shows an exemplary test emission pattern not containing multipulses, whereas FIG. 14(b) shows an exemplary test emission pattern containing multipulses.

FIG. 15(a) shows an exemplary test emission pattern in the case of 4×. Herein, Mx means that the speed with which the optical disk is accessed is an M times speed. FIG. 15(b) shows an exemplary test emission pattern in the case of 5×; FIG. 15(c) shows an exemplary test emission pattern in the case of 6×; FIG. 15(d) shows an exemplary test emission pattern in the case of 7×; and FIG. 15(e) shows an exemplary test emission pattern in the case of 8×.

A laser emission waveform when recording is composed of a combination of a plurality of powers (see, for example, Patent Literature 1). FIG. 12 shows a laser emission waveform when recording. In a space portion, light is emitted at a space power $120s$. In a mark portion, light is emitted with a combination of a peak power $120p$, a mark power $120m$, and a cooling power $120c$. Laser power control at recording is applied to all of the aforementioned powers.

An effective method of avoiding power fluctuations is performing a power calibration per every constant period. For example, in an optical disk format having a sector structure as shown in FIG. 13(a), one test area for correcting laser power is provided per sector. In this case, as the focal point of a light beam passes through a test area, laser power control based on test emission is performed in that test area, thus avoiding power fluctuations.

In an optical disk format that lacks test areas, it is necessary to perform laser power control in a data area, in which data recording is to occur. In that case, the peak power and the cooling power, whose emission times are short, are difficult to be detected especially in the case of a high linear velocity, and thus control errors tend to increase.

Hereinafter, any linear velocity will be expressed as an x-speed with respect to a standard linear velocity according to specifications.

CITATION LIST

Patent Literature

Patent Document No. 1: Japanese Laid-Open Patent Publication No. 2007-280498

SUMMARY OF INVENTION

Technical Problem

Depending on the optical disk format, test areas may be aligned along a radial direction, as shown in FIG. 13(a), or not aligned along a radial direction, as shown in FIG. 13(b).

When the test areas are not aligned along a radial direction, if light is emitted at a high power for a long time, there is a possibility that unfavorable influences may occur on the data of adjoining tracks, such that the data may be destroyed. In FIG. 14, a laser emission waveform in a test area is shown on the left side, whereas a laser emission waveform in a data area is shown on the right side. If light is emitted at a peak power in a test area for a longer time than the data emission waveform as shown in FIG. 14(a), the aforementioned concern will emerge. Therefore, as shown in FIG. 14(b), the peak power portion in a test area is made into multipulses. By doing this, the heat quantity applied to the adjoining tracks is reduced, thus suppressing data destruction.

When the peak power portion of a test area is made into multipulses as shown in FIG. 14(b), the frequency of the multipulses will change as the recording x-speed changes. Relative to a multipulse frequency in the case of 4× shown in FIG. 15(a), as the x-speed increases from FIG. 15(b) to FIG. 15(c), FIG. 15(d), and FIG. 15(e), it takes shorter and shorter time to pass through a test area, thus increasing the frequency of the multipulses.

When laser power control is performed through an average value detection of multipulses during test emission, the detected average value will have an error with respect to the true value due to influences of frequency distortion of a photodetection device caused by changes in the frequency of the multipulses. The aforementioned error will cause a peak power error.

When the photodetection device is of a form such that it produces a differential output, there is an advantage of immunity against transmission noises. However, due to differences in frequency characteristics from differential channel to differential channel, the error of the detected average value of multipulses will be increased.

In an optical disk, the ultimate highest x-speed is the speed under the CAV (Constant Angular Velocity) method. Under the CAV method, the x-speed will increase little by little from the inner periphery toward the outer periphery. The frequency of multipulses will also increase little by little, such that the error of laser power control will be deteriorated with the radial position.

The present invention has been made in order to solve the aforementioned problems, and improves the control accuracy of a peak power of a light beam at a high x-speed.

Solution to Problem

An optical disk apparatus according to the present invention comprises: an emission section for outputting a light beam to be radiated on an information medium; a current adjustment section for detecting a light amount of the light beam and adjusting a current to be supplied to the emission section; a recording clock generation section for generating a recording clock signal to serve as a reference at data recording; a frequency division section for dividing the recording clock signal to generate a divided clock signal; a recording pattern calculation section for setting a data recording emission pattern based on the recording clock signal, the data recording emission pattern being for recording data; a test pattern calculation section for setting a test emission pattern for test recording based on the divided clock signal, the test emission pattern being for controlling a power of the light beam which is output from the emission section; and a current output section for supplying a current to the emission section based on an emission pattern which is selected from between the data recording emission pattern and the test emission pattern and on a current value which is calculated by the current adjustment section, characterized in that, when a linear velocity at recording changes, the frequency division section adjusts a division ratio in a direction of reducing a change in frequency of the divided clock signal.

In one embodiment, a velocity detection section for detecting the linear velocity is further comprised, wherein the frequency division section adjusts the division ratio based on the detected linear velocity.

In one embodiment, the velocity detection section detects the linear velocity based on an address on the information medium.

In one embodiment, the velocity detection section detects the linear velocity based on a wobble frequency of a track on the information medium.

In one embodiment, the velocity detection section detects the linear velocity based on a radial position on the information medium at which the light beam is radiated.

In one embodiment, the frequency division section adjusts the division ratio based on the recording clock signal.

In one embodiment, the frequency division section adjusts the division ratio based on the divided clock signal.

In one embodiment, when performing recording by a CLV method, the frequency division section ensures that the frequency of the divided clock signal is constant.

In one embodiment, when performing recording by a CAV method, the frequency division section ensures that the frequency of the divided clock signal is within a predetermined frequency range by changing the division ratio according to a radial position on the information medium at which the light beam is radiated.

In one embodiment, the current adjustment section includes: a light amount detection section for detecting the power of the light beam which is output from the emission section and generating a power detection signal; a sample-hold section for detecting a plurality of levels of signals by sampling the power detection signal at different timings; a power calculation section for calculating a plurality of powers of the light beam based on output signals from the sample-hold section; and a current calculation section for calculating the current to be supplied to the emission section based on the plurality of calculated powers, wherein, the current calculation section possesses a non-detection scheme for, based on a power value other than a highest power value that is calculated by the power calculation section, calculating a current corresponding to the highest power value; and at any linear velocity other than the reference linear velocity, the current calculation section calculates a current corresponding to the highest power value by using the non-detection scheme.

In one embodiment, the current calculation section possesses a detection scheme for calculating a current corresponding to the highest power by using a highest detected power value calculated by the power calculation section, wherein at the reference linear velocity, the current calculation section calculates a current corresponding to the highest power value by using the detection scheme.

In one embodiment, the current calculation section chooses a linear velocity which is defined according to specifications of the information medium as a reference linear velocity.

In one embodiment, when performing recording by a CAV method, the current calculation section chooses a linear velocity at an innermost periphery of the information medium as a reference linear velocity.

In one embodiment, the frequency division section calculates a frequency range of the divided clock signal based on difference between an average power and a middle power at multipulse emission.

In one embodiment, the frequency division section calculates a frequency range of the divided clock signal based on a frequency band of pulses of a light beam detectable to the current adjustment section.

An optical disk apparatus according to the present invention comprises: an emission section for outputting a light beam to be radiated on an information medium; a current adjustment section for detecting a light amount of the light beam and adjusting a current to be supplied to the emission section; a recording clock generation section for generating a recording clock signal to serve as a reference at data recording; a test clock generation section for generating a test clock signal to be used at test recording; a recording pattern calculation section for setting a data recording emission pattern based on the recording clock signal, the data recording emission pattern being for recording data; a test pattern calculation section for setting a test emission pattern for test recording based on the test clock signal, the test emission pattern being for controlling a power of the light beam which is output from the emission section; and a current output section for supplying a current to the emission section based on an emission pattern which is selected from between the data recording emission pattern and the test emission pattern and on a current value which is calculated by the current adjustment section, characterized in that the test clock generation section generates the test clock signal so as to have a constant frequency irrespectively of a linear velocity at recording.

In one embodiment, the test pattern calculation section masks at least one of a beginning and an end of a multipulsed portion in the test emission pattern.

In one embodiment, the sample-hold section masks sampling timing so that sampling does not occur at any timing at which the test pattern calculation section applies masking.

In one embodiment, the test pattern calculation section ensures that a beginning and an end of the test emission pattern are not multipulses.

In one embodiment, the test pattern calculation section increases a proportion of multipulses occupied in the test emission pattern as the linear velocity increases.

In one embodiment, the test pattern calculation section increases a proportion of multipulses occupied in the test emission pattern as the linear velocity increases.

In one embodiment, the test pattern calculation section allows multipulses to be included in the test emission pattern even when the data recording emission pattern does not include multipulses.

In one embodiment, the test pattern calculation section allows multipulses to be included in the test emission pattern even when the data recording emission pattern does not include multipulses.

A laser power controlling method according to the present invention comprises: a recording clock generation step of generating a recording clock signal to serve as a reference at data recording; a frequency division step of dividing the recording clock signal to generate a divided clock signal; a recording pattern calculation step of setting a data recording emission pattern based on the recording clock signal, the data recording emission pattern being for recording data; a test pattern calculation step of setting a test emission pattern for test recording based on the divided clock signal, the test emission pattern being for controlling a power of a light beam; and a current outputting step of supplying a current to an emission section based on an emission pattern which is selected from between the data recording emission pattern and the test emission pattern, characterized in that the frequency division step includes a step of adjusting a division ratio in a direction of reducing a change in frequency of the divided clock signal when a linear velocity at recording changes.

A laser power controlling method according to the present invention comprises: a recording clock generation step of generating a recording clock signal to serve as a reference at data recording; a test clock generation step of generating a test clock signal to be used at test recording; a recording pattern calculation step of setting a data recording emission pattern based on the recording clock signal, the data recording emission pattern being for recording data; a test pattern calculation step of setting a test emission pattern for test recording based on the test clock signal, the test emission pattern being for controlling a power of a light beam; and a current outputting step of supplying a current to an emission section based on an emission pattern which is selected from between the data recording emission pattern and the test emission pattern, characterized in that the test clock generation step includes a step of generating the test clock signal so as to have a constant frequency irrespectively of a linear velocity at recording.

Advantageous Effects of Invention

In the optical disk apparatus of the present invention, a division ratio is determined so that the change in frequency of a divided clock signal is reduced, irrespectively of the recording linear velocity. Therefore, it is possible to control peak power without depending on the band characteristics of the photodetection device, whereby the accuracy of laser power control can be improved.

Furthermore, in the optical disk apparatus of the present invention, the x-speed detection section detects a linear velocity at recording, and the frequency division section determines a division ratio based on the detected linear velocity from the x-speed detection section. Thus, a change in frequency of the test emission pattern can be reduced with a simple construction.

Furthermore, in the optical disk apparatus of the present invention, the x-speed detection section detects an address on the information medium, and detects a linear velocity by using the address. Thus, in a state where the revolutions have been stabilized, it is possible to surely detect which x-speed it is.

Furthermore, in the optical disk apparatus of the present invention, the x-speed detection section detects a wobble of a track on the information medium, and detects a linear velocity by using the frequency of the wobble. Thus, it is possible to detect which x-speed it is even when the revolutions are in a transient state.

Furthermore, in the optical disk apparatus of the present invention, the x-speed detection section detects a radial position on the information medium at which a light beam is radiated, and detects a linear velocity by using the radial position. Thus, even in a state where addresses cannot be read, it is possible to detect which x-speed it is, so long as revolutions have been stabilized.

Furthermore, in the optical disk apparatus of the present invention, the frequency division section determines a division ratio based on a recording clock signal from the recording clock generation section. Thus, a change in frequency of the test emission pattern can be reduced.

Furthermore, in the optical disk apparatus of the present invention, the frequency division section determines a division ratio based on the divided clock signal from the frequency division section. Thus, a change in frequency of the test emission pattern can be reduced.

Furthermore, in the optical disk apparatus of the present invention, when recording is performed based on CLV, the frequency division section ensures that the frequency of the divided clock signal is constant irrespectively of the linear velocity. Thus, the accuracy of laser power control of the peak power based on CLV can be improved.

Furthermore, in the optical disk apparatus of the present invention, when recording is performed based on CAV, the frequency division section ensures that the frequency of the divided clock signal is in a predetermined frequency range, by changing the division ratio according to the radial position. Thus, the accuracy of laser power control of the peak power based on CAV can be improved.

Furthermore, in the optical disk apparatus of the present invention, the current calculation section possesses a non-detection scheme for calculating a current corresponding to a highest power value based on a current corresponding to a power value other than the highest power value, without using a highest detected power value which is calculated by the power calculation section, such that the non-detection scheme is employed at any linear velocity other than a reference linear velocity. Thus, the accuracy of laser power control of the peak power at any intermediate x-speed based on CAV can be improved.

Furthermore, in the optical disk apparatus of the present invention, the current calculation section possesses a detection scheme for calculating a current corresponding to a highest power value by using a highest detected power value which is calculated by the power calculation section, such that the detection scheme is employed at a reference linear velocity. Thus, the accuracy of laser power control of the peak power at any intermediate x-speed based on CAV can be improved.

Furthermore, in the optical disk apparatus of the present invention, the current calculation section chooses a linear velocity which is defined according to specifications of the information medium as a reference linear velocity. Thus, the accuracy of laser power control of the peak power at any intermediate x-speed based on CAV can be improved.

Furthermore, in the optical disk apparatus of the present invention, the current calculation section chooses as a reference linear velocity a linear velocity at the innermost periphery when performing recording based on CAV. Thus, the accuracy of laser power control of the peak power at any intermediate x-speed based on CAV can be improved.

Furthermore, in the optical disk apparatus of the present invention, the frequency division section determines a predetermined frequency range based on the size of discrepancy between an average power and a middle power at multipulse emission. Thus, it is possible to determine a multipulse frequency of test emission for reducing deteriorations in the accuracy of laser power control of the peak power.

Furthermore, in the optical disk apparatus of the present invention, the frequency division section determines a predetermined frequency range based on the band which is detectable to the light amount detection section. Thus, it is possible to determine a multipulse frequency of test emission for reducing deteriorations in the accuracy of laser power control of the peak power.

Moreover, in the optical disk apparatus of the present invention, the test clock generation section generates the test clock signal so as to have a constant frequency irrespectively of the recording linear velocity. Therefore, it is possible to control peak power without depending on the band characteristics of the photodetection device, whereby the accuracy of laser power control can be improved.

Furthermore, in the optical disk apparatus of the present invention, at a portion where switching between the test emission pattern and the data recording emission pattern occurs, the test pattern calculation section masks at least one of the beginning and the end of a multipulsed portion so that the duty of multipulses within the test emission pattern will not change. Thus, the influence of edge disorders when switching between the recording clock signal and the test clock signal can be reduced.

Furthermore, in the optical disk apparatus of the present invention, the sample-hold section masks sampling timing so that sampling does not occur at any timing where the test pattern calculation section applies masking. Thus, the influence of edge disorders when switching between the recording clock signal and the test clock signal can be reduced.

Furthermore, in the optical disk apparatus of the present invention, the test pattern calculation section ensures that the beginning and the end of the test emission pattern are not multipulses. Thus, the influence of edge disorders when switching between the recording clock signal and the test clock signal can be reduced.

Furthermore, in the optical disk apparatus of the present invention, the test pattern calculation section increases a proportion of multipulses occupied in the test emission pattern when the linear velocity is high. Thus, high x-speeds can be supported without changing an LPF band for acquiring the multi-pulse average value.

Furthermore, in the optical disk apparatus of the present invention, the test pattern calculation section allows multipulses to be included in the test emission pattern even when multipulses do not exist in the data recording emission pattern. Thus, it is possible to perform a stable laser power control which does not depend on the strategy.

Moreover, in the laser power controlling method of the present invention, a division ratio is determined so that the change in frequency of a divided clock signal is reduced, irrespectively of the recording linear velocity. Therefore, it is possible to control peak power without depending on the band characteristics of the photodetection device, whereby the accuracy of laser power control can be improved.

Moreover, in the laser power controlling method of the present invention, a test clock signal having a constant frequency is generated, irrespectively of the recording linear velocity. Therefore, it is possible to control peak power without depending on the band characteristics of the photodetection device, whereby the accuracy of laser power control can be improved.

DESCRIPTION OF EMBODIMENTS

Hereinafter, Embodiments of the present invention will be described with reference to the drawings.

Embodiment 1

An operation of an optical disk apparatus 100 according to Embodiment 1 of the present invention will be described with reference to FIG. 1, FIG. 2, FIG. 3, FIG. 4, FIG. 5, and FIG. 6.

Figure 1:
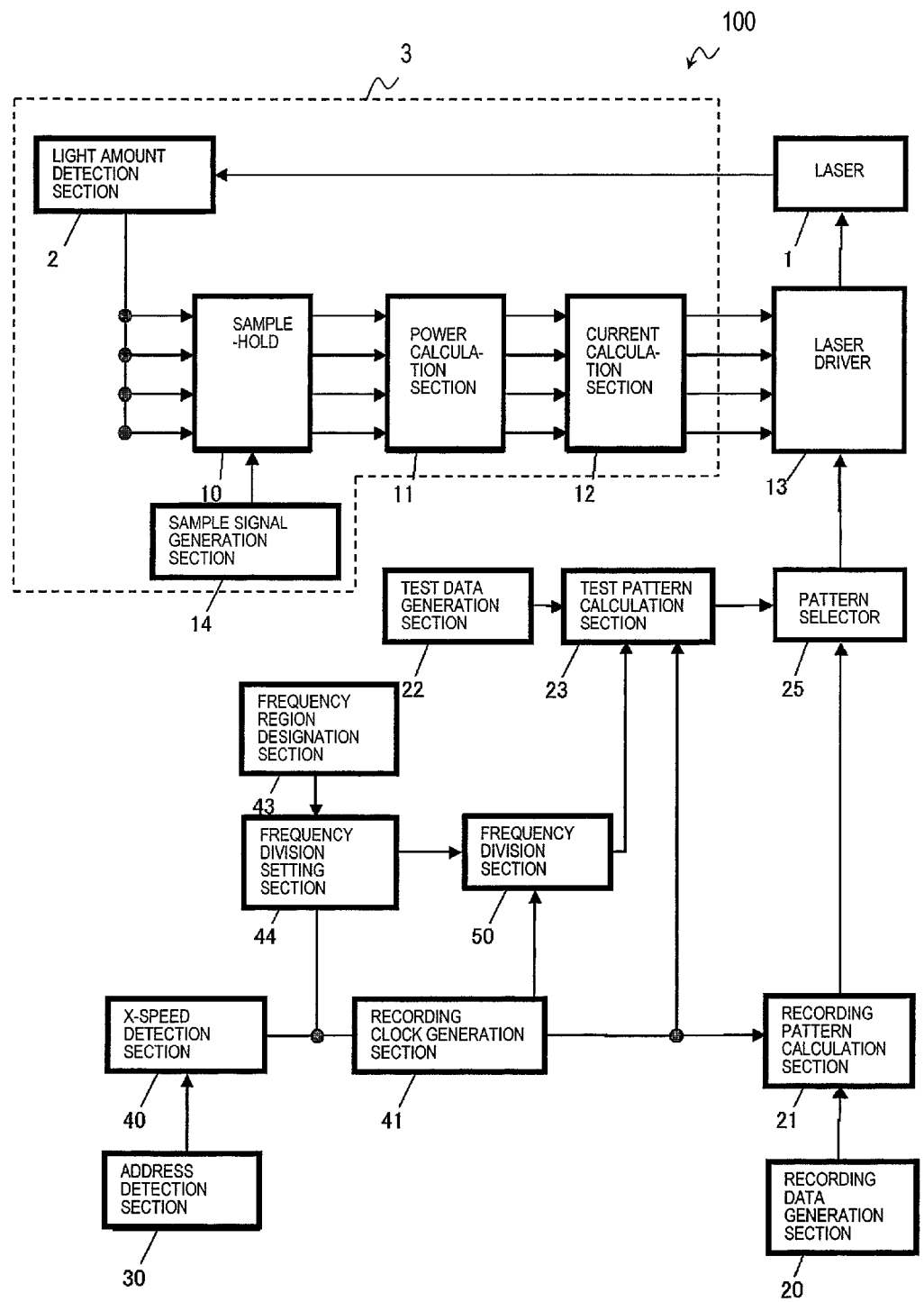
FIG. 1 A diagram showing an optical disk apparatus according to Embodiment 1 of the present invention.
Figure 2:
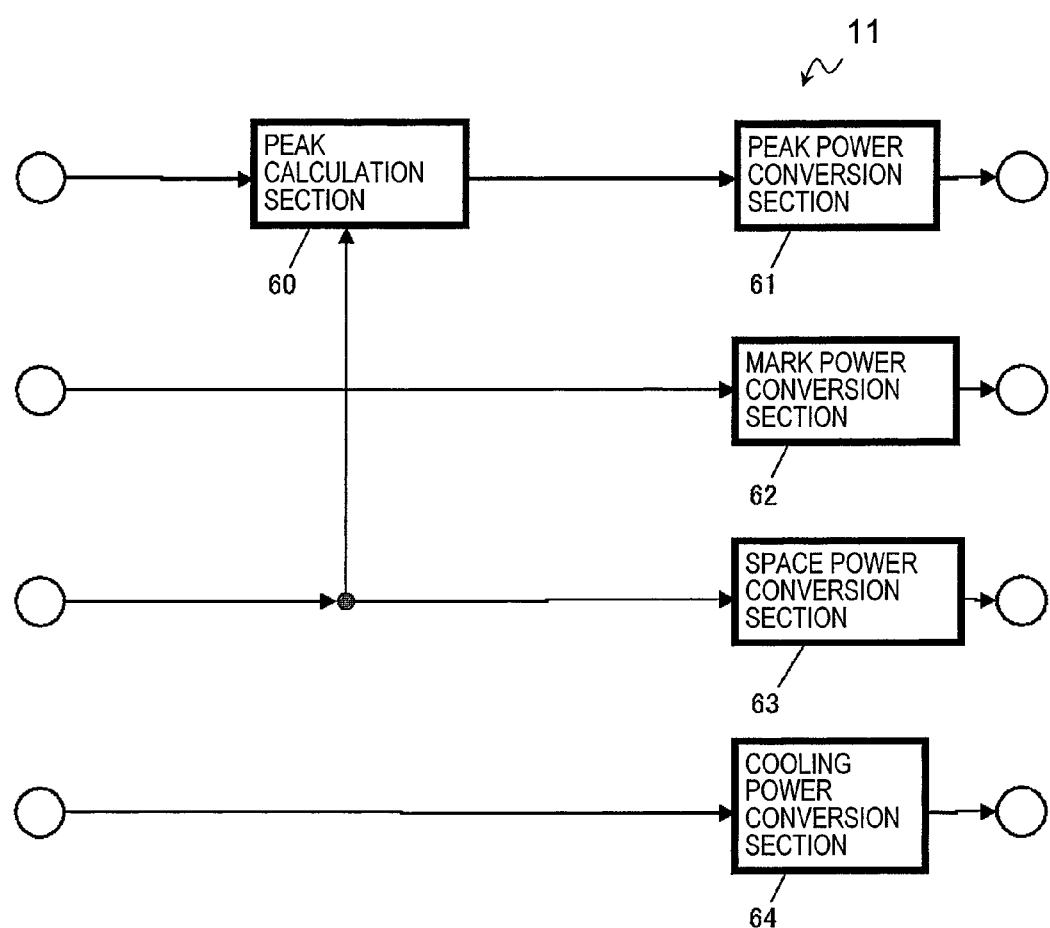
FIG. 2 A diagram showing an exemplary detailed block construction of a power calculation section according to Embodiment 1 of the present invention.
Figure 3:
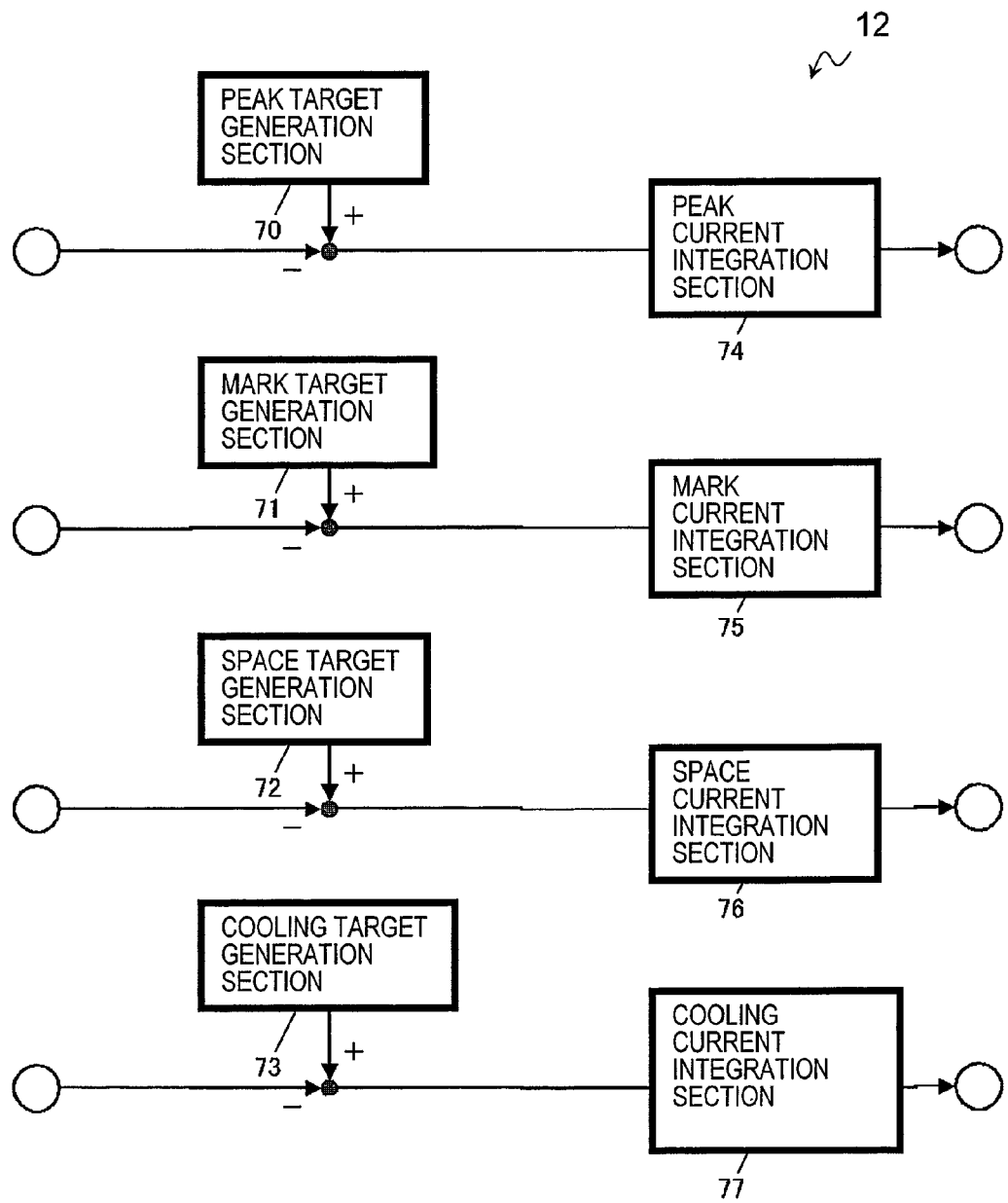
FIG. 3 A diagram showing an exemplary detailed block construction of a current calculation section according to Embodiment 1 of the present invention.
Figure 4:
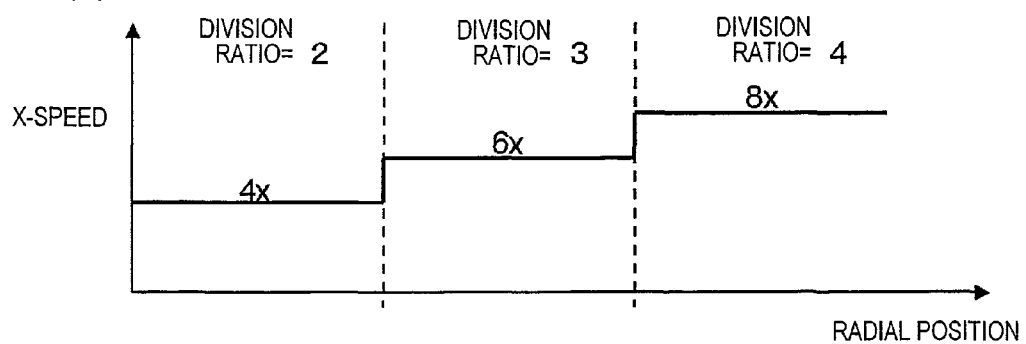
FIG. 4($a$) is a diagram showing examples of x-speeds against radial positions based on ZCLV according to Embodiment 1 of the present invention, and ($b$) is a diagram showing examples of x-speeds against radial positions based on PCAV according to Embodiment 1 of the present invention.
Figure 4:
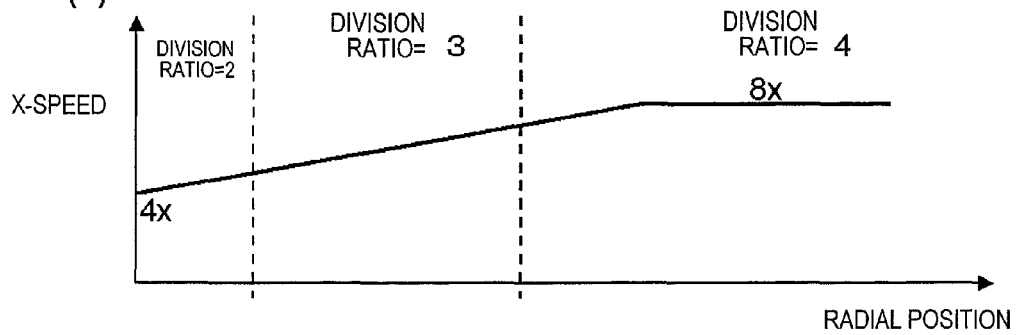

FIG. 1 is a block diagram showing constituent elements of the optical disk apparatus 100. FIG. 2 is a diagram showing an exemplary detailed block construction of a power calculation section 11. FIG. 3 is a diagram showing an exemplary detailed block construction of a current calculation section 12.

FIG. 4(a) shows examples of x-speeds against radial positions based on ZCLV (Zone Constant Linear Velocity). FIG. 4(b) shows examples of x-speeds against radial positions based on PCAV (Partial Constant Angular Velocity).

The ZCLV method is a method in which a plurality of CLV methods exist along a radial direction of a disk. The PCAV method is a method which assumes the CAV method at the disk inner periphery side and assumes the CLV method at the outer periphery side. Examples of methods combining at least one of the CLV method or the CAV method are the ZCLV method and the PCAV method.

FIG. 5(a) shows an exemplary recording clock signal which is output from a recording clock generation section 41. FIG. 5(b) shows an exemplary divided clock signal which is output from a frequency division section 50. FIG. 5(c) shows an exemplary test emission pattern signal which is output from a test pattern calculation section 23.

FIG. 6(a) shows an exemplary test emission pattern signal which is output from the test pattern calculation section 23 in the case of 4×. FIG. 6(b) shows an exemplary test emission pattern signal which is output from the test pattern calculation section 23 in the case of 5×. FIG. 6(c) shows an exemplary test emission pattern signal which is output from the test pattern calculation section 23 in the case of 6×. FIG. 6(d) shows an exemplary test emission pattern signal which is output from the test pattern calculation section 23 in the case of 7×. FIG. 6(e) shows an exemplary test emission pattern signal which is output from the test pattern calculation section 23 in the case of 8×.

Referring to FIG. 1, FIG. 2, and FIG. 3, a laser light source 1, which is an emission section outputting a light beam, is a semiconductor light-emitting device, for example. The light beam which is output from the laser light source 1 is radiated via an optical system onto an optical disk as an information medium, whereby recording/reproduction of information is carried out. A current adjustment section 3 receives the light beam which is output from the laser light source 1 to detect a light amount of the light beam, and calculates a current to be applied to the laser light source 1. The current adjustment section 3 includes a light amount detection section 2, a sample-hold section 10, the power calculation section 11, the current calculation section 12, and a sample signal generation section 14. The light amount detection section 2 detects the power of the light beam which is output from the laser light source 1, and outputs a power detection signal. By the sample-hold section 10 and the sample signal generation section 14, the power detection signal is sampled at different timings, and signals of a plurality of levels are detected.

Based on the output signal from the sample-hold section 10, the power calculation section 11 calculates a plurality of powers of the light beam. As shown in FIG. 2, the power calculation section 11 includes a peak calculation section 60, a peak power conversion section 61, a mark power conversion section 62, a space power conversion section 63, and a cooling power conversion section 64.

Based on the plurality of powers calculated by the power calculation section 11, the current calculation section 12 calculates currents to be applied to the laser light source 1. As shown in FIG. 3, the current calculation section 12 includes a peak target generation section 70, a mark target generation section 71, a space target generation section 72, a cooling target generation section 73, a peak current integration section 74, a mark current integration section 75, a space current integration section 76, and a cooling current integration section 77.

A pattern selector 25 and a laser driver 13 function as a current output section for supplying a current to the laser light source 1 based on an emission pattern, which is selected from between a data recording emission pattern and a test emission pattern, and on the current value calculated by the current calculation section 12.

Based on a recording clock signal, a recording data generation section 20 and a recording pattern calculation section 21 calculate and set a data recording emission pattern for recording data. Based on a divided clock signal, a test data generation section 22 and the test pattern calculation section 23 calculate and set a test emission pattern for test recording with which to control the power of the light beam which is output from the laser light source 1.

An address detection section 30 and an x-speed detection section 40 function as a velocity detection section for detecting a linear velocity when accessing an optical disk. The recording clock generation section 41 generates a recording clock signal which serves as a reference at data recording. The recording clock signal is divided by a frequency region designation section 43, a frequency division setting section 44, and the frequency division section 50, whereby a divided clock signal is generated.

In FIG. 1, the light amount detection section 2 receives a light beam from the laser light source 1, and sends a power detection signal which is in accordance with the power of the light beam to the sample-hold section 10. To the sample-hold section 10, the sample signal generation section 14 sends a sampling timing for acquiring each power of the light beam. The sample-hold section 10 samples the signal from the light amount detection section 2 based on a sampling signal from the sample signal generation section 14, and sends each hold signal to the power calculation section 11. Based on each hold signal from the sample-hold section 10, the power calculation section 11 calculates each detected power of the light beam, and sends it to the current calculation section 12. Based on each detected power value of the light beam as calculated by the power calculation section 11, the current calculation section 12 calculates each current to be supplied to the laser light source 1, and sends it to the laser driver 13.

The address detection section 30 detects address information of a spot position of the light beam radiated on the optical disk, and sends it to the x-speed detection section 40. Based on the address information from the address detection section 30, the x-speed detection section 40 detects which x-speed it is, and sends it to the recording clock generation section 41 and the frequency division setting section 44.

Based on the x-speed information from the x-speed detection section 40, the recording clock generation section 41 generates a recording clock signal, and sends it to the frequency division section 50, the test pattern calculation section 23, and the recording pattern calculation section 21. The recording data generation section 20 generates data to be recorded, and sends it to the recording pattern calculation section 21. In order to record the data from the recording data generation section 20, the recording pattern calculation section 21 calculates a data recording emission pattern on the basis of the recording clock signal from the recording clock generation section 41, and sends it to the pattern selector 25.

To the frequency division setting section 44, the frequency region designation section 43 sends a frequency range based on a frequency band of the pulses of the light beam which is detectable to the light amount detection section 2. Since the frequency range is determined from the band which is detectable to the light amount detection section 2, it is possible to determine a multipulse frequency which can reduce deteriorations in the accuracy of laser power control of the peak power.

Based on the x-speed detected by the x-speed detection section 40, the frequency division setting section 44 infers the frequency of the recording clock signal, calculates a division ratio such that the inferred frequency of the clock falls within the frequency range from the frequency region designation section 43, and sends it to the frequency division section 50. By using the division ratio from the frequency division setting section 44, the frequency division section 50 divides the recording clock signal from the recording clock generation section 41, and sends it to the test pattern calculation section 23.

The test data generation section 22 generates data to be test-recorded, and sends it to the test pattern calculation section 23. The test pattern calculation section 23 calculates a test emission pattern on the basis of the recording clock signal from the recording clock generation section 41, and sends it to the pattern selector 25, so as to cause emission of the laser light source 1 based on the test data. When outputting multipulses within the test emission pattern, the test pattern calculation section 23 generates multipulses based on the divided clock signal from the frequency division section 50.

Based on the optical disk format, the pattern selector 25 selects a data recording emission pattern from the recording pattern calculation section 21 while in a data area, or selects a test emission pattern from the test pattern calculation section 23 while in a test area, and sends it to the laser driver 13. To the emission pattern from the pattern selector 25, the laser driver 13 adds each current from the current calculation section 12, and sends it to the laser light source 1. The laser light source 1 emits light in accordance with the current from the laser driver 13.

In FIG. 2, among the hold signals from the sample-hold section 10, signals of the three values excluding the multipulsed portion are translated from signal levels to light beam emission power levels by, respectively, the mark power conversion section 62, the space power conversion section 63, and the cooling power conversion section 64. As for a signal holding an average value of the multipulses, when the multipulses are generated from a peak power and a space power, the peak calculation section 60 calculates a signal corresponding to a peak level of the multipulses based on the signal holding the average value of the multipulses and a signal corresponding to the space power, and sends it to the peak power conversion section 61. The peak power conversion section 61 translates the signal from the peak calculation section 60 from a signal level to a light beam emission power level.

In the current calculation section 12 shown in FIG. 3, a peak power target value which is generated by the peak target generation section 70 is subtracted from a peak power detection value which is calculated by the power calculation section 11, and this is sent to the peak current integration section 74. The peak current integration section 74 integrates the value after the subtraction, and sends it to the laser driver 13. A mark power target value which is generated by the mark target generation section 71 is subtracted from a mark power detection value which is output from the power calculation section 11, and this is sent to the mark current integration section 75. The mark current integration section 75 integrates the value after the subtraction, and sends it to the laser driver 13. A space power target value which is generated by the space target generation section 72 is subtracted from a space power detection value which is output from the power calculation section 11, and this is sent to the space current integration section 76. The space current integration section 76 integrates the value after the subtraction, and sends it to the laser driver 13. A cooling power target value which is generated by the cooling target generation section 73 is subtracted from a cooling power detection value which is output from the power calculation section 11, and this is sent to the cooling current integration section 77. The cooling current integration section 77 integrates the value after the subtraction, and sends it to the laser driver 13.

After the peak power, the mark power, the space power, and the cooling power are each detected by the sample-hold section 10, and after power levels (power values) are calculated by the power calculation section 11, a current to be supplied to the laser light source 1 is determined by the current calculation section 12 so as to match each target power.

When recording is performed based on ZCLV as shown in FIG. 4(a), a division ratio of 2 is selected in a 4×-speed region at the disk inner periphery side, a division ratio of 3 is selected in a 6×-speed region in the middle of the disk, and a division ratio of 4 is selected in an 8×-speed region at the disk outer periphery side, whereby the divided clock frequency from the frequency division section 50 at each x-speed is always kept constant. As a result, it is possible to perform recording at a high x-speed while conserving the accuracy of average value detection of the multipulses.

When recording is performed based on PCAV as shown in FIG. 4(b), a division ratio of 2 is selected in a region near the 4×-speed at the disk inner periphery side, a division ratio of 3 is selected in a region near the 6×-speed in the middle of the disk, and a division ratio of 4 is selected in a region near the 8×-speed at the disk outer periphery side, whereby the range of change in the divided clock frequency from the frequency division section 50 at each x-speed can be reduced. Thus, when the linear velocity at recording changes, the frequency division section 50 adjusts the division ratio so that the change in frequency of the divided clock signal is reduced, thus making it possible to perform a high x-speed recording while minimizing deteriorations in the accuracy of average value detection of the multipulses.

Figure 5:
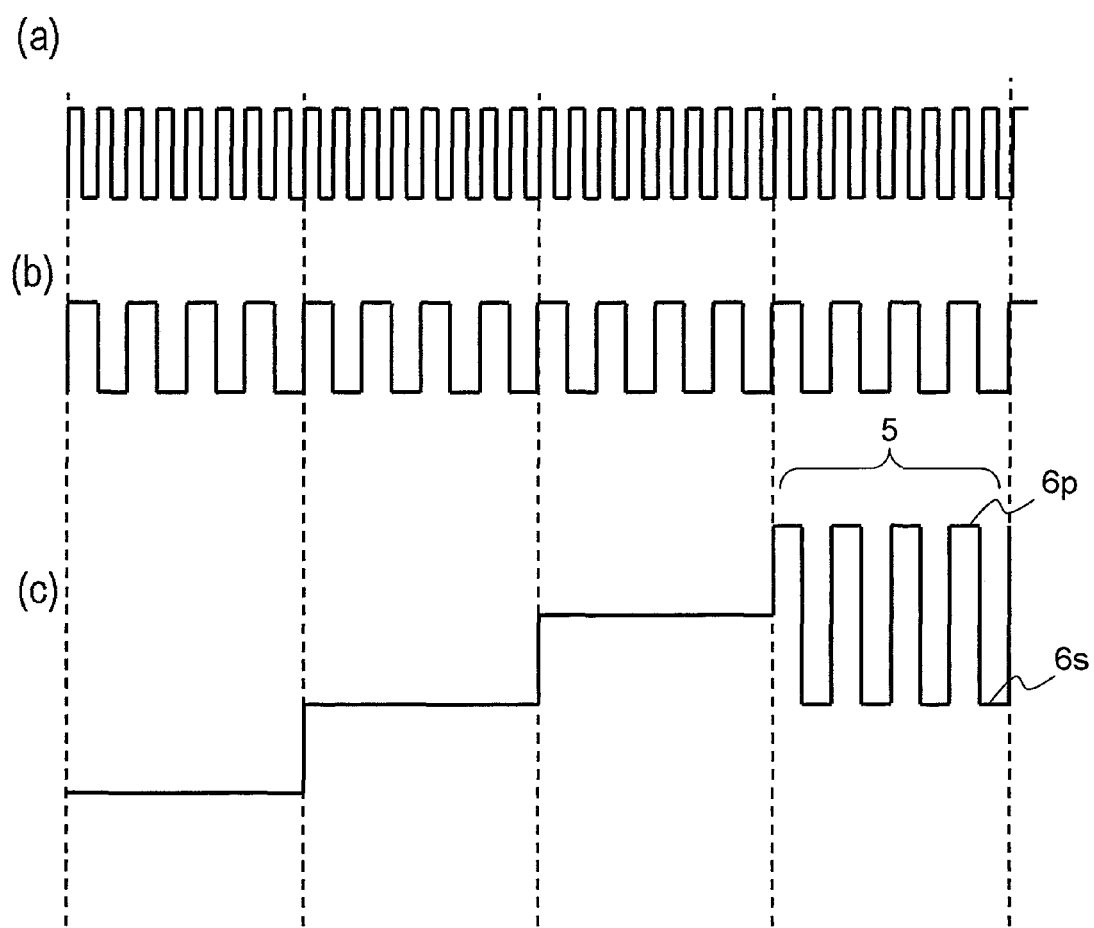
FIG. 5($a$) is a diagram showing an exemplary recording clock signal according to Embodiment 1 of the present invention; ($b$) is a diagram showing an exemplary divided clock signal according to Embodiment 1 of the present invention; and ($c$) is a diagram showing an exemplary test emission pattern signal according to Embodiment 1 of the present invention.

FIG. 5 shows an exemplary operation of the test pattern calculation section 23. A cooling level, a space level, a mark level, and a peak level are sent from the test data generation section 22 in this order. The test pattern calculation section 23 keeps counts of the recording clock from the recording clock generation section 41 shown in FIG. 5(a), and switches the emission pattern at equal intervals. In the portion of the peak level 6p as shown in FIG. 5(c), the test pattern calculation section 23 generates multipulses 5 by combining the peak level 6p and the space level 6s. The test pattern calculation section 23 uses the divided clock signal from the frequency division section 50 shown in FIG. 5(b) when generating the multipulses 5.

Figure 6:
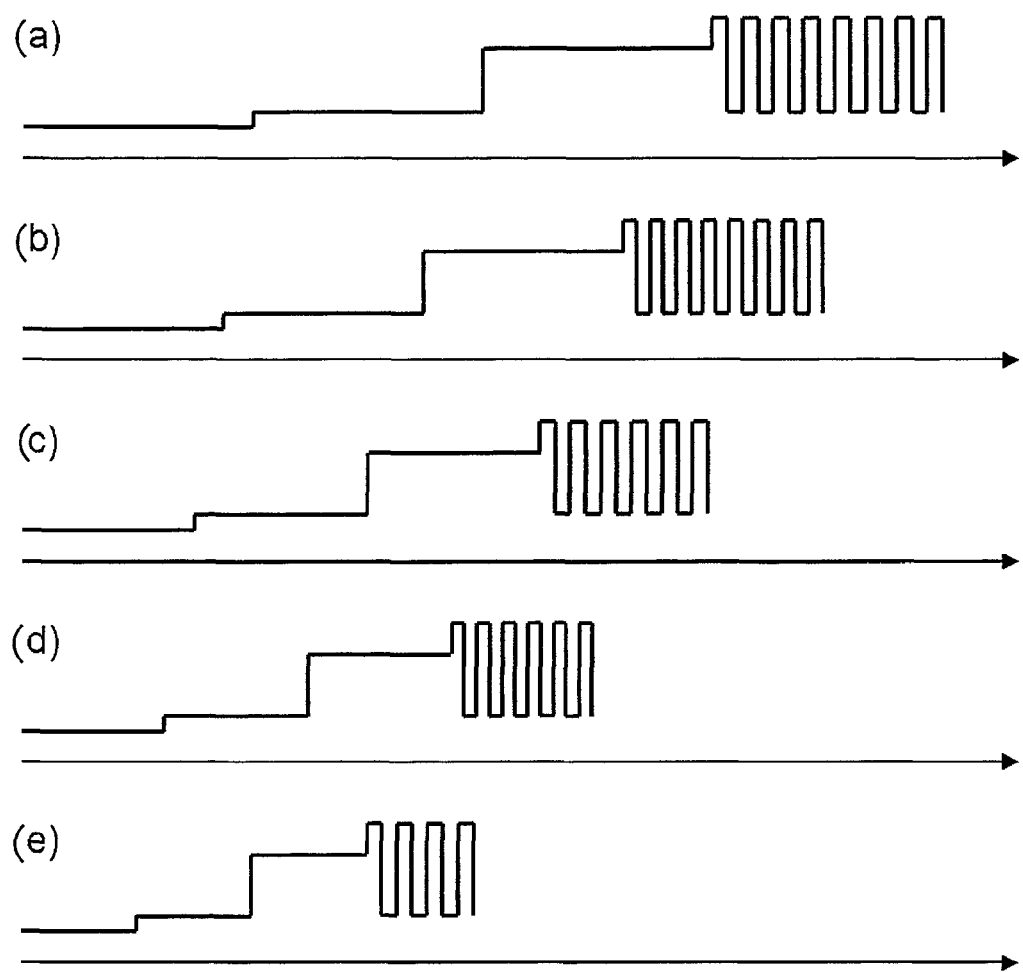
FIG. 6($a$) is a diagram showing an exemplary test emission pattern signal in the case of 4× according to Embodiment 1 of the present invention; ($b$) is a diagram showing an exemplary test emission pattern signal in the case of 5× according to Embodiment 1 of the present invention; ($c$) is a diagram showing an exemplary test emission pattern signal in the case of 6× according to Embodiment 1 of the present invention; ($d$) is a diagram showing an exemplary test emission pattern signal in the case of 7× according to Embodiment 1 of the present invention; and ($e$) is a diagram showing an exemplary test emission pattern signal in the case of 8× according to Embodiment 1 of the present invention.
Figure 15:
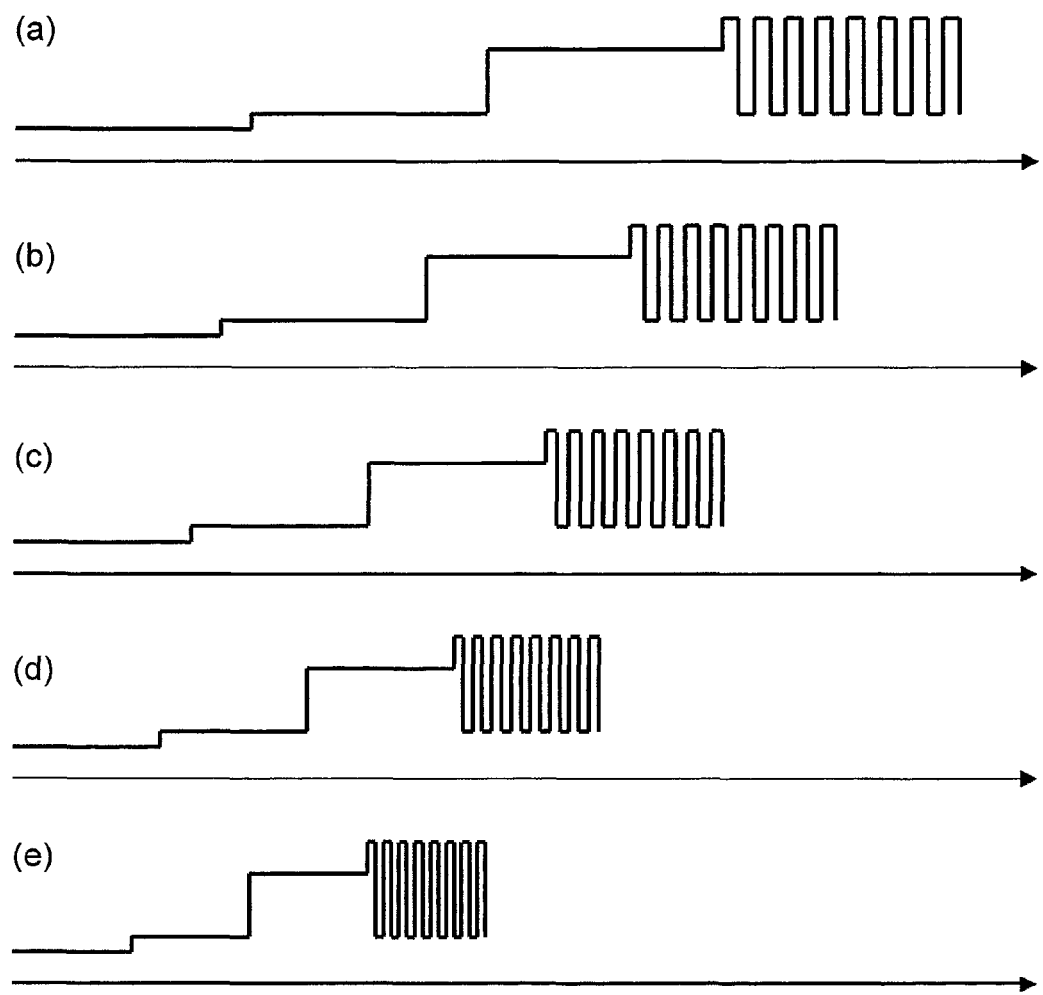
FIG. 15(a) is a diagram showing an exemplary test emission pattern in the case of 4×; (b) is a diagram showing an exemplary test emission pattern in the case of 5×; (c) is a diagram showing an exemplary test emission pattern in the case of 6×; (d) is a diagram showing an exemplary test emission pattern in the case of 7×; and (e) is a diagram showing an exemplary test emission pattern in the case of 8×.

FIG. 6 shows test emission patterns at the respective x-speeds from 4× to 8×. Since the division ratio of the frequency division section 50 is switched, the multipulse frequencies at 4×, 6×, and 8× are made equal, as shown in FIG. 6(a), FIG. 6(c), and FIG. 6(e). Also at 5× and 7× as shown in FIG. 6(b) and FIG. 6(d), the range of change in the multipulse frequency is made narrower than in FIG. 15. As a result, it is possible to perform a high x-speed recording while minimizing deteriorations in the accuracy of average value detection of the multipulses.

Thus, by dividing the recording clock signal from the recording clock generation section 41 for special use in the test areas at the frequency division section 50, changes in the frequency of multipulse emission by the laser light source 1 can be reduced in the test areas; deteriorations in the detection accuracy of the multi-pulse average value can be reduced; and the deteriorations in the accuracy of laser power control of the peak power can be reduced.

Although x-speeds are detected from addresses in this Embodiment 1, a wobble of a track of the optical disk may be detected, and the x-speed detection section 40 may detect a linear velocity and an x-speed by using the wobble frequency. Alternatively, a radial position of the optical disk at which the light beam is radiated may be detected, and the x-speed detection section 40 may detect a linear velocity and an x-speed by using the detected radial position. The radial position can be detected from the position of an optical pickup, for example.

Although this Embodiment 1 illustrates that the division ratio in the frequency division section 50 is determined according to the x-speed, the division ratio may be determined from the frequency of a division ratio input. Alternatively, the division ratio may be determined from the frequency of a division ratio output. Specifically, the frequency of an input signal to the frequency division section 50 may be measured, and a division ratio may be determined which ensures that the output signal from the frequency division section 50 falls within the frequency range that is determined by the frequency region designation section 43, and a feed-forward-type correction may be made. Further alternatively, the frequency of an output signal from the frequency division section 50 may itself be measured, and a division ratio may be determined so that it falls within the frequency range that is determined by the frequency region designation section 43, and a feedback-type correction may be made. Thus, the frequency division section 50 may adjust the division ratio based on the divided clock signal.

Moreover, multipulses may be used for test emission regardless of whether multipulses exist in the emission pattern at data recording or not.

In this Embodiment 1, the frequency range that is determined by the frequency region designation section 43 is determined from the frequency characteristics of the light amount detection section 2; however, it may be determined from multi-pulse average value detection error characteristics. Depending on the frequency characteristics of the laser emission section 1 and the laser driver 13, the waveform of the multipulses may be distorted at a high frequency. In the case of multipulses with a duty of 50%, although an average value of the peak power and the bottom power must be detected, the detection value may be shifted toward the peak power side or the bottom power side due to a distortion that has occurred, thus causing a detection error. Such a detection error can be prevented by calculating the frequency range of the divided clock signal and defining a frequency range by taking into account the size of the discrepancy between the average power and the middle power at multipulse emission.

This Embodiment 1 illustrates an operation based on ZCLV or PCAV. However, it is also applicable to other operation methods such as FULLCLV and FULLCAV.

This Embodiment 1 illustrates detection of an average value of multipulses in order to detect a peak power. However, a peak level of multipulses may also be detected.

This Embodiment 1 illustrates that the multipulses at test emission are multipulses which combine the peak power and the space power. However, multipulses may also be formed by any combination other than a combination of the peak power and the space power.

In this Embodiment 1, the present invention is applied to changes in the frequency of the recording clock signal from the recording clock generation section 41 that are associated with changes in the x-speed. However, the present invention may be applied to changes in the frequency of the recording clock signal due to differences in medium types.

Embodiment 2

Figure 7:
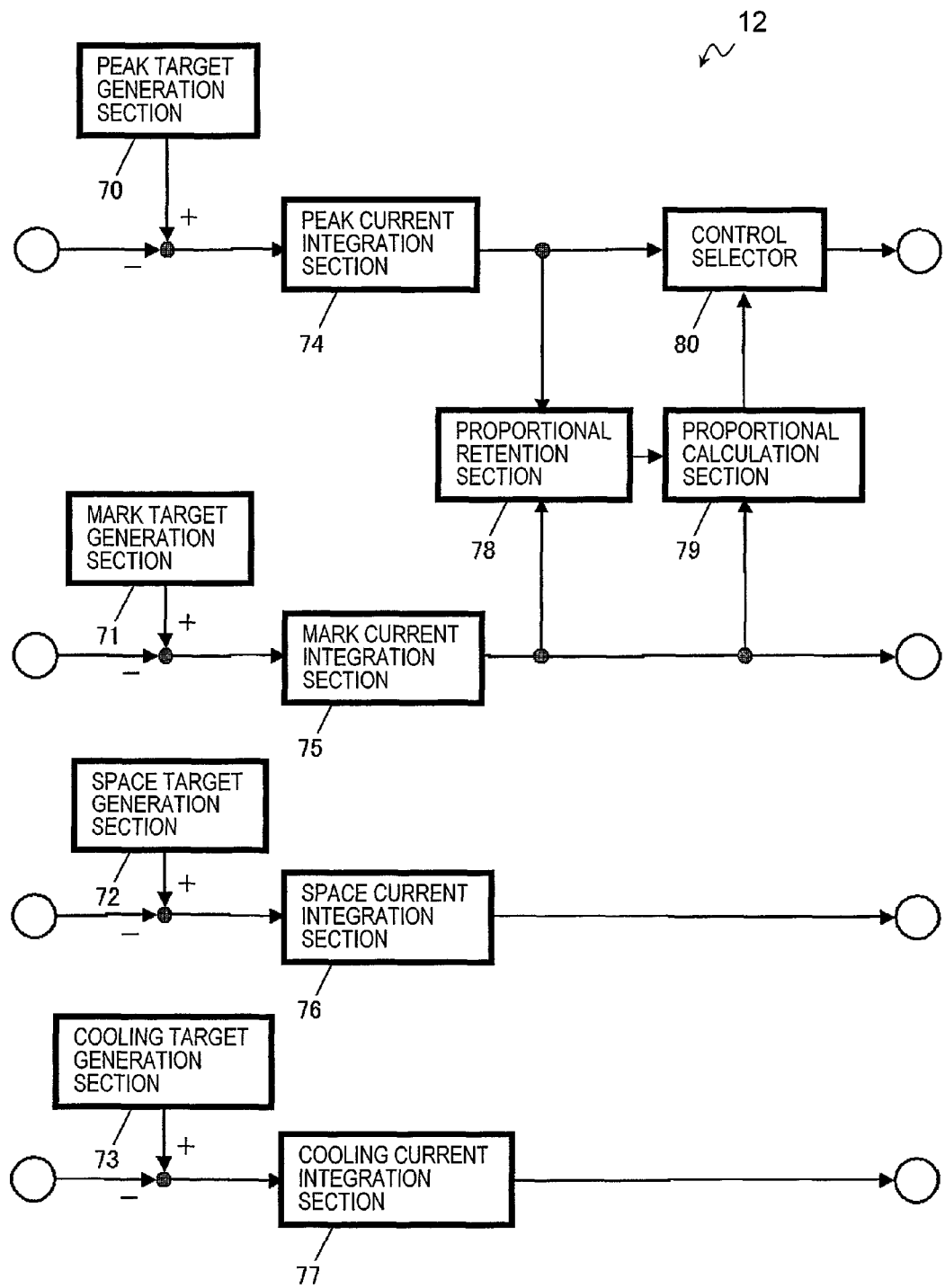
FIG. 7 A diagram showing an exemplary detailed block construction of a current calculation section according to Embodiment 2 of the present invention.
Figure 8:
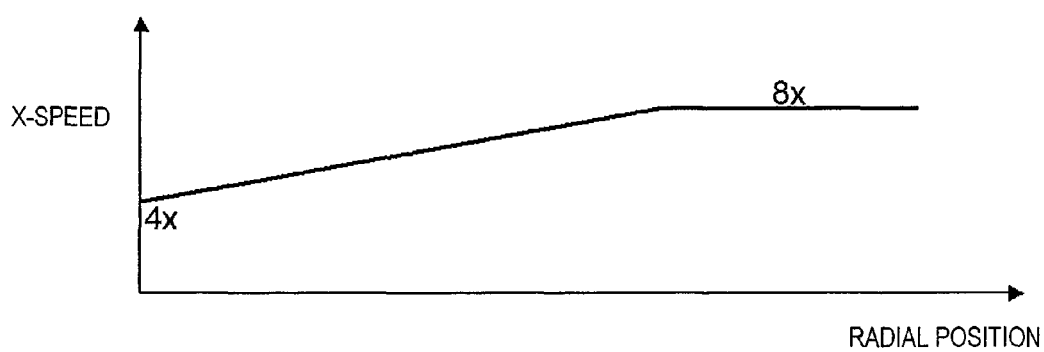
FIG. 8($a$) is a diagram showing examples of x-speeds against radial positions based on PCAV according to Embodiment 2 of the present invention; ($b$), ($c$) and ($d$) are diagrams each showing an exemplary control selected by a control selector depending on the radial position according to Embodiment 2 of the present invention.
Figure 8:
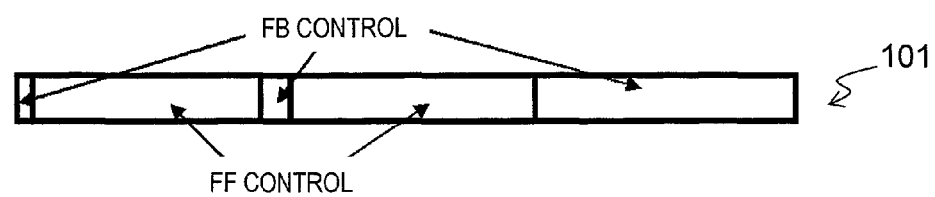
Figure 8:
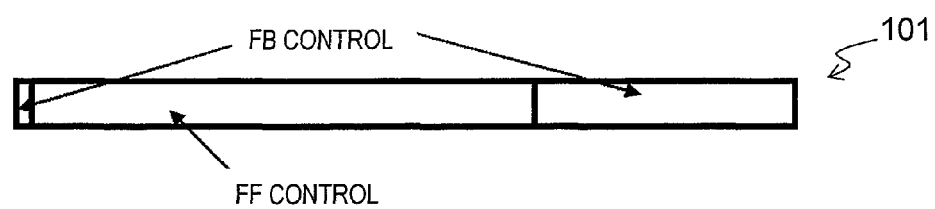
Figure 8:
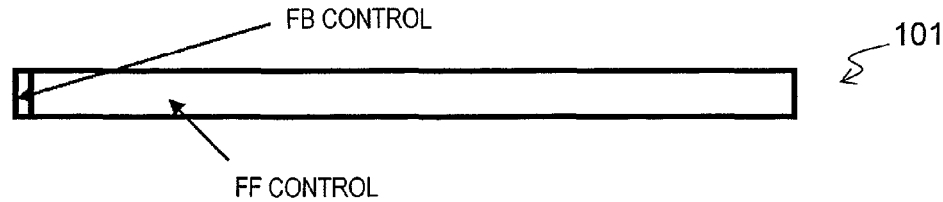

An operation of an optical disk apparatus 100 according to Embodiment 2 of the present invention will be described with reference to FIG. 1, FIG. 7, and FIG. 8. FIG. 7 is a diagram showing an exemplary detailed block construction of a current calculation section 12 of the present embodiment. FIG. 8(a) shows examples of x-speeds against radial positions on an optical disk 101 based on CAV, whereas FIG. 8(b), FIG. 8(c) and FIG. 8(d) each show an exemplary control selected by a control selector 80 corresponding to the radial position on the optical disk 101. A light beam which is output from the laser light source 1 of the optical disk apparatus 100 is radiated onto the optical disk 101, whereby recording/reproduction of information is carried out.

In FIG. 7, the current calculation section 12 includes a peak target generation section 70, a mark target generation section 71, a space target generation section 72, a cooling target generation section 73, a peak current integration section 74, a mark current integration section 75, a space current integration section 76, a cooling current integration section 77, a proportional retention section 78, a proportional calculation section 79, and a control selector 80.

In FIG. 1, the light amount detection section 2 receives a light beam from the laser light source 1, and sends a signal which is in accordance with the power of the light beam to the sample-hold section 10. To the sample-hold section 10, the sample signal generation section 14 sends a sampling timing for acquiring each power of the light beam. The sample-hold section 10 samples the signal from the light amount detection section 2 based on a sampling signal from the sample signal generation section 14, and sends each hold signal to the power calculation section 11. Based on each hold signal from the sample-hold section 10, the power calculation section 11 calculates each detected power of the light beam, and sends it to the current calculation section 12. Based on each detected power of the light beam as calculated by the power calculation section 11, the current calculation section 12 calculates each current to be supplied to the laser light source 1, and sends it to the laser driver 13.

The address detection section 30 detects address information of a spot position of the light beam radiated on the optical disk, and sends it to the x-speed detection section 40. Based on the address information from the address detection section 30, the x-speed detection section 40 detects which x-speed it is, and sends it to the recording clock generation section 41 and the frequency division setting section 44.

Based on the x-speed information from the x-speed detection section 40, the recording clock generation section 41 generates a recording clock signal, and sends it to the frequency division section 50, the test pattern calculation section 23, and the recording pattern calculation section 21. The recording data generation section 20 generates data to be recorded, and sends it to the recording pattern calculation section 21. In order to record the data from the recording data generation section 20, the recording pattern calculation section 21 calculates a data recording emission pattern on the basis of the recording clock signal from the recording clock generation section 41, and sends it to the pattern selector 25.

To the frequency division setting section 44, the frequency region designation section 43 sends a frequency range based on a frequency band of the pulses of the light beam which is detectable to the light amount detection section 2. Based on the x-speed detected by the x-speed detection section 40, the frequency division setting section 44 infers the frequency of the recording clock signal, calculates a division ratio such that the inferred frequency of the clock falls within the frequency range from the frequency region designation section 43, and sends it to the frequency division section 50. By using the division ratio from the frequency division setting section 44, the frequency division section 50 divides the recording clock signal from the recording clock generation section 41, and sends it to the test pattern calculation section 23.

The test data generation section 22 generates data to be test-recorded, and sends it to the test pattern calculation section 23. The test pattern calculation section 23 calculates a test emission pattern on the basis of the recording clock signal from the recording clock generation section 41, and sends it to the pattern selector 25, so as to cause emission of the laser light source 1 based on the test data. When outputting multipulses within the test emission pattern, the test pattern calculation section 23 generates multipulses based on the divided clock signal from the frequency division section 50.

Based on the optical disk format, the pattern selector 25 selects a data recording emission pattern from the recording pattern calculation section 21 while in a data area, or selects a test emission pattern from the test pattern calculation section 23 while in a test area, and sends it to the laser driver 13. To the emission pattern from the pattern selector 25, the laser driver 13 adds each current from the current calculation section 12, and sends it to the laser light source 1. The laser light source 1 emits light in accordance with the current from the laser driver 13.

In the current calculation section 12 shown in FIG. 7, a peak power target value which is generated by the peak target generation section 70 is subtracted from a peak power detection value which is calculated by the power calculation section 11, and this is sent to the peak current integration section 74. The peak current integration section 74 integrates the value after the subtraction, and sends it to the control selector 80 and the proportional retention section 78. A mark power target value which is generated by the mark target generation section 71 is subtracted from a mark power detection value which is output from the power calculation section 11, and this is sent to the mark current integration section 75. The mark current integration section 75 integrates the value after the subtraction, and sends it to the proportional retention section 78, the proportional calculation section 79, and the laser driver 13.

A space power target value which is generated by the space target generation section 72 is subtracted from a space power detection value which is output from the power calculation section 11, and this is sent to the space current integration section 76. The space current integration section 76 integrates the value after the subtraction, and sends it to the laser driver 13. A cooling power target value which is generated by the cooling target generation section 73 is subtracted from a cooling power detection value which is output from the power calculation section 11, and this is sent to the cooling current integration section 77. The cooling current integration section 77 integrates the value after the subtraction, and sends it to the laser driver 13.

The proportional retention section 78 calculates and retains a ratio between the integral from the peak current integration section 74 and the integral from the mark current integral, and sends it to the proportional calculation section 79. To the control selector 80, the proportional calculation section 79 sends a specific calculation value which is obtained by multiplying the integral from the mark current integration section 75 by the ratio from the proportional retention section 78. The control selector 80 selects the integral from the peak current integration section 74 or the specific calculation value from the proportional calculation section 79, and sends it to the laser driver 13.

There are two laser power controlling methods to be executed by the current calculation section 12 shown in FIG. 7. In the first method, which is a feed back control method (hereinafter referred to as the FB control method), a peak power, a mark power, a space power, and a cooling power are detected by the sample-hold section 10, and after power values are calculated by the power calculation section 11, a current to be supplied to the laser light source 1 is determined by the current calculation section 12 so as to match each target power.

The second method, which is a feedforward control method (hereinafter referred to as the FF control method), is identical to the FB control method in terms of its laser power control for the mark power, the space power, and the cooling power. However, as for the peak power, the second method is a non-detection scheme where no detected peak power detection value is used, but a peak current is determined such that its ratio with respect to the mark current is constant.

The FB control method will provide sure control if the detected powers are reliable, but there is a tendency in that the accuracy of laser power control is likely to be deteriorated under the influence of instability of detection. Although the FF control method is stable irrespectively of the reliability of detected powers, the accuracy of laser power control will be directly influenced by the accuracy of the ratio, e.g., bends in the IL characteristics of the laser light source 1.

FIG. 8 shows a manner of selection between the FF control method and the FB control method in the case of performing PCAV recording. As has been described in Embodiment 1, the multipulse frequency can be made constant at 4×, 6×, and 8×, based on the division ratio in the frequency division section 50. As shown in FIG. 8(*b*), the FB control method is selected in the neighborhood of the aforementioned x-speeds (4×, 6×, and 8×), whereas the FF control method is selected at any other x-speed. As a result, deteriorations in the accuracy of laser power control associated with the multipulse frequency when selecting the FB control method can be suppressed. Moreover, a ratio in the proportional retention section 78 which is to be used when selecting the FF control method may be determined from a current at the time of selecting the FB control method, thus making it possible to suppress deteriorations in the accuracy of laser power control due to deteriorations in ratio accuracy when selecting the FF control method.

Thus, by dividing the recording clock signal from the recording clock generation section 41 for special use in the test areas at the frequency division section 50, changes in the frequency of multipulse emission by the laser light source 1 can be reduced in the test areas; deteriorations in the detection accuracy of the multi-pulse average value can be reduced; and the deteriorations in the accuracy of laser power control of the peak power can be reduced. At any x-speed where the frequency of the multi-pulse average value is slightly deviated, deteriorations in the accuracy of laser power control of the peak power can be further reduced by keeping a constant ratio between the peak current and the mark current, without employing a peak power detection value.

In this Embodiment 2, the FB control method is selected in the neighborhood of the linear velocities defined according to the specifications of the optical disk (x-speed: 4×, 6×, 8×). However, the FB control method may be chosen only in the neighborhood of the x-speed at the innermost periphery of the disk. Alternatively, the FB control method may be chosen only in the neighborhood of the x-speeds at the innermost periphery and the outermost periphery. Moreover, when recording by the CAV method, the current calculation section 12 may use the linear velocity at the innermost periphery of the optical disk as a reference linear velocity. As a result of this, the accuracy of laser power control of the peak power at any intermediate x-speed based on CAV can be improved.

In this Embodiment 2, the FB control method is selected in the neighborhood of x-speeds which are defined according to the specifications of the optical disk. The neighborhood includes ±0.5 speed, ±0.1 speed, and the like, but the present invention is not limited thereto.

Moreover, multipulses may be used for test emission regardless of whether multipulses exist in the emission pattern at data recording or not.

In this Embodiment 2, the frequency range that is designated by the frequency region designation section 43 is determined from the frequency characteristics of the light amount detection section 2. However, it may be determined from the multi-pulse average value detection error characteristics.

This Embodiment 2 illustrates an operation based on ZCLV or PCAV. However, it is also applicable to other operation methods such as FULLCLV and FULLCLV.

This Embodiment 2 illustrates detection of an average value of multipulses in order to detect a peak power. However, a peak level of multipulses may also be detected.

This Embodiment 2 illustrates that the multipulses at test emission are multipulses which combine the peak power and the space power. However, multipulses may also be formed by any combination other than a combination of the peak power and the space power.

In this Embodiment 2, the present invention is applied to changes in the frequency of the recording clock signal from the recording clock generation section 41 that are associated with changes in the x-speed. However, the present invention may be applied to changes in the frequency of the recording clock signal due to differences in medium types.

In this Embodiment 2, the source of calculation for the peak current under the FF control method is the mark current. However, the space power or the cooling power may be selected as the source of calculation.

Embodiment 3

The construction and operation of an optical disk apparatus 200 according to Embodiment 3 of the present invention will be described with reference to FIG. 9, FIG. 10, and FIG. 11.

Figure 9:
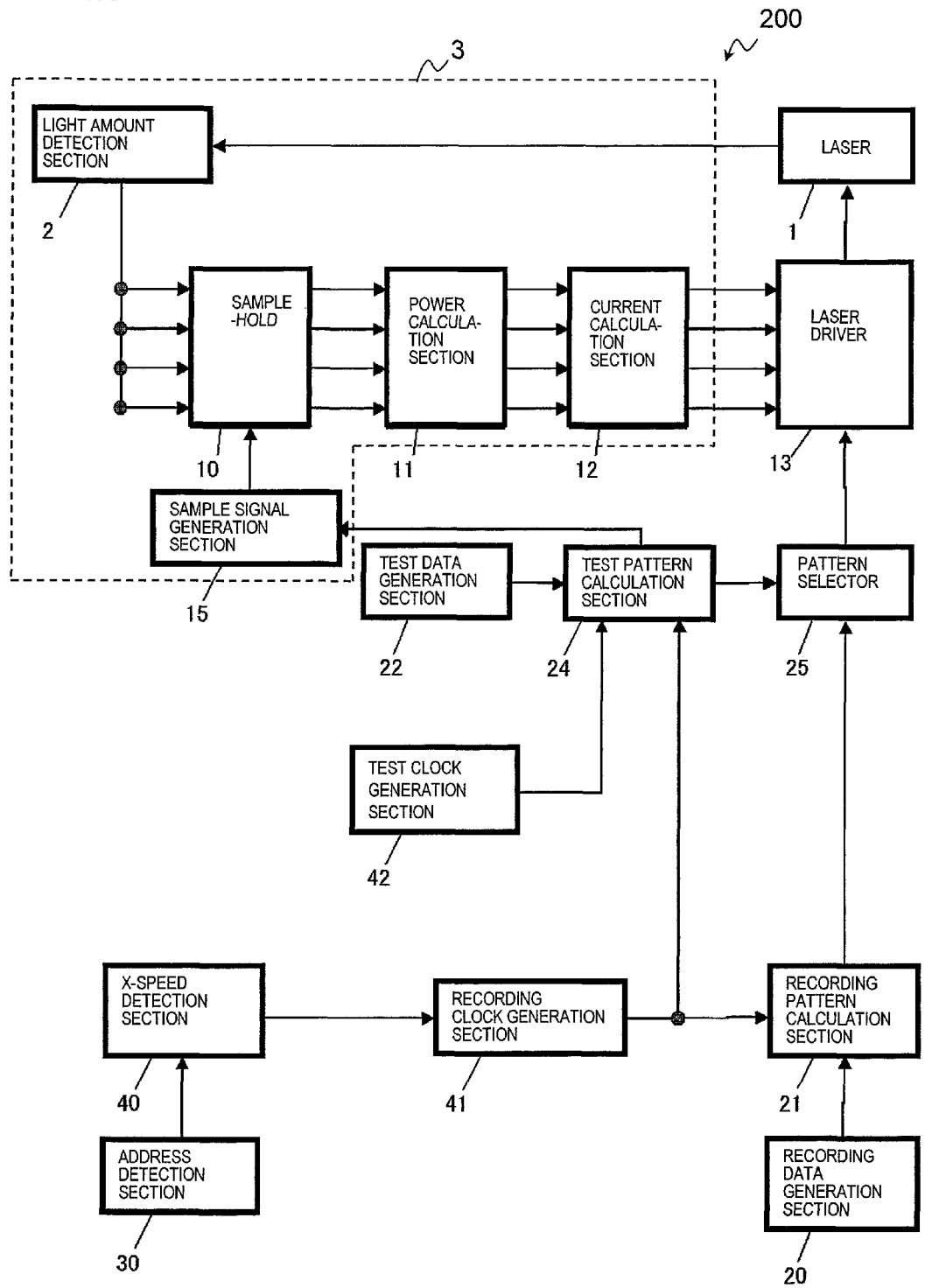
FIG. 9 A diagram showing an optical disk apparatus according to Embodiment 3 of the present invention.

FIG. 9 is a block diagram showing constituent elements of the optical disk apparatus 200. FIG. 10(*a*) shows an exemplary recording clock signal which is output from the recording clock generation section 41. FIG. 10(*b*) shows an exemplary test clock signal which is output from a test clock generation section 42. FIG. 10(*c*) shows an exemplary test emission pattern signal which is output from a test pattern calculation section 24 to the pattern selector 25. FIG. 10(*d*) shows an exemplary signal which is output from the test pattern calculation section 24 to a sample signal generation section 15 for masking.

Figure 11:
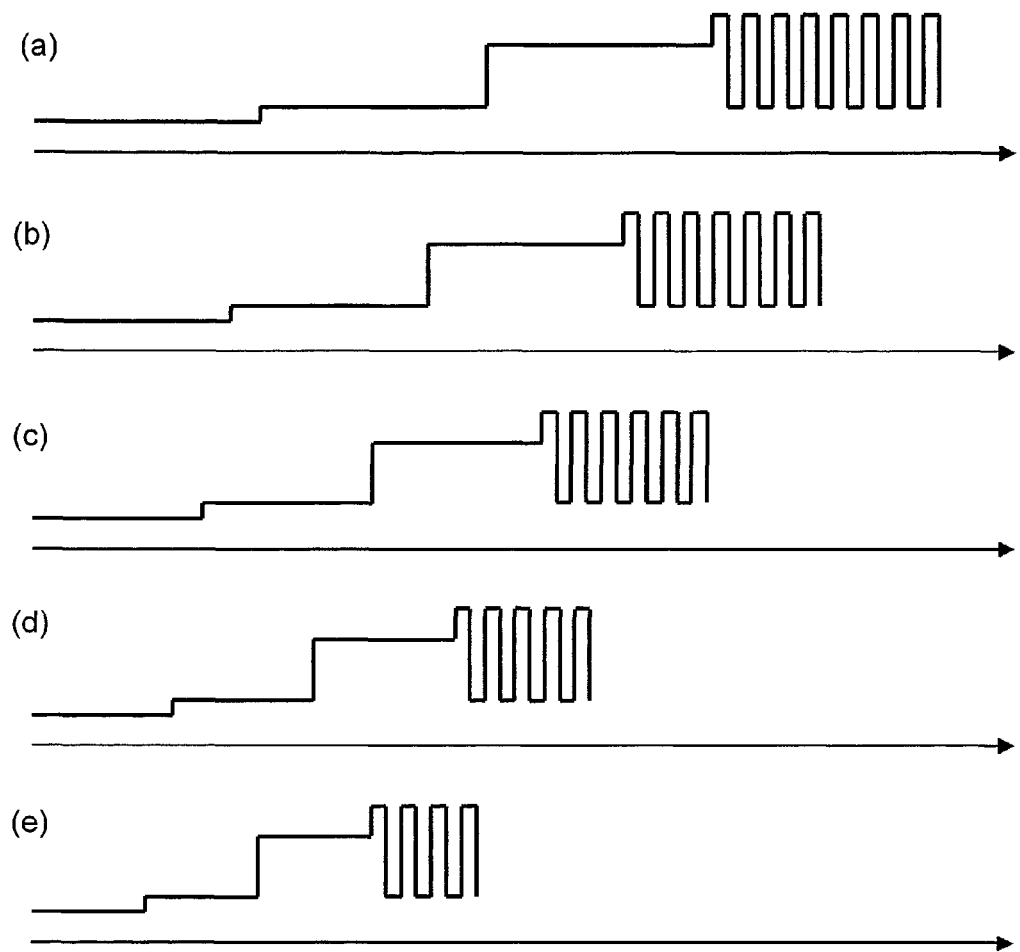
FIG. 11(a) is a diagram showing an exemplary test emission pattern signal in the case of 4× according to Embodiment 3 of the present invention; (b) is a diagram showing an exemplary test emission pattern signal in the case of 5× according to Embodiment 3 of the present invention; (c) is a diagram showing an exemplary test emission pattern signal in the case of 6× according to Embodiment 3 of the present invention; (d) is a diagram showing an exemplary test emission pattern signal in the case of 7× according to Embodiment 3 of the present invention; and (e) is a diagram showing an exemplary test emission pattern signal in the case of 8× according to Embodiment 3 of the present invention.
Figure 12:
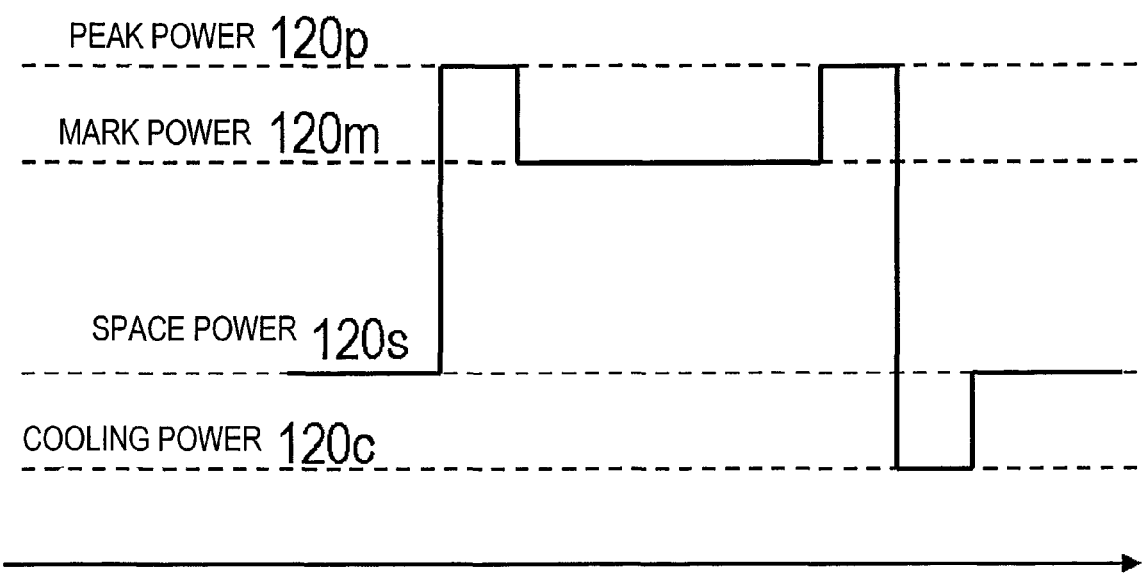
FIG. 12 A diagram showing an exemplary emission waveform of a laser light source at recording.
Figure 13:
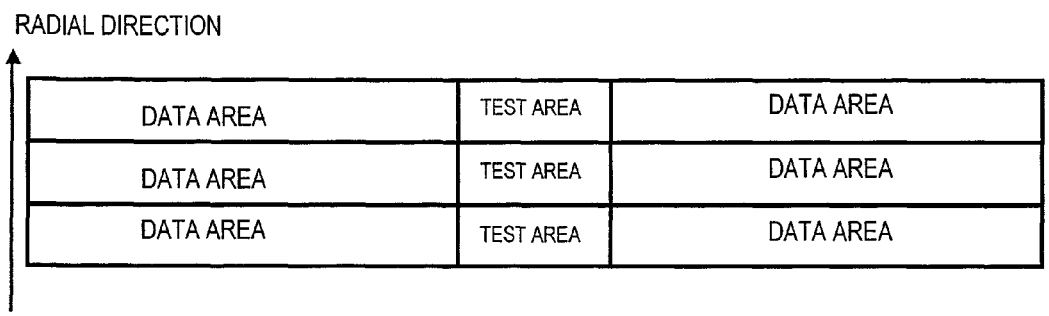
FIG. 13(a) is a diagram showing a layout of test areas of a DVD-RAM, and (b) is a diagram showing a layout of test areas of a BD.
Figure 13:
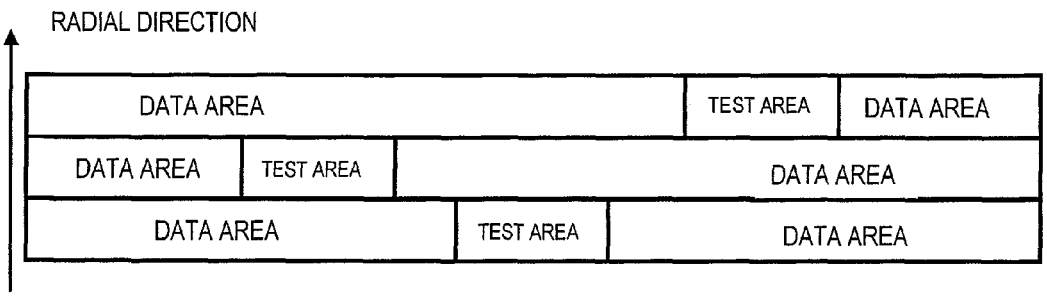
Figure 14:
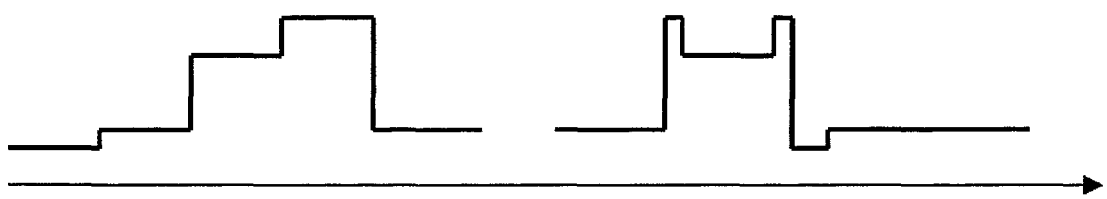
FIG. 14(a) is a diagram showing an exemplary test emission pattern not containing multipulses, and (b) is a diagram showing an exemplary test emission pattern containing multipulses.
Figure 14:
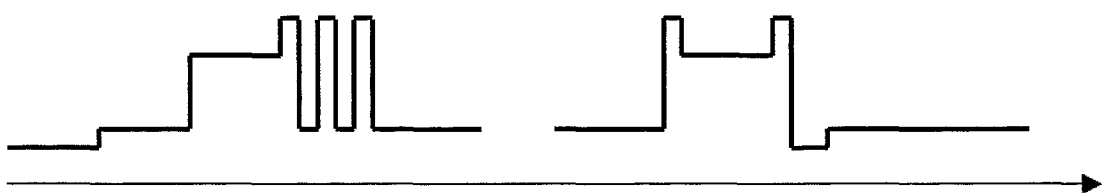

FIG. 11(*a*) shows an exemplary test emission pattern signal which is output from the test pattern calculation section 24 in the case of 4×. FIG. 11(*b*) shows an exemplary test emission pattern signal which is output from the test pattern calculation section 24 in the case of 5×. FIG. 11(*c*) shows an exemplary test emission pattern signal which is output from the test pattern calculation section 24 in the case of 6×. FIG. 11(*d*) shows an exemplary test emission pattern signal which is output from the test pattern calculation section 24 in the case of 7×. FIG. 11(*e*) shows an exemplary test emission pattern signal which is output from the test pattern calculation section 24 in the case of 8×.

Instead of the frequency region designation section 43, the frequency division setting section 44, and the frequency division section 50 of the optical disk apparatus 100 shown in FIG. 1, the optical disk apparatus 200 includes the test clock generation section 42. Moreover, instead of the test pattern calculation section 23 and the sample signal generation section 14 of the optical disk apparatus 100, the optical disk apparatus 200 includes the test pattern calculation section 24 and the sample signal generation section 15.

The test clock generation section 42 generates a test clock signal at test recording. The test data generation section 22 and the test pattern calculation section 24 function as a test pattern calculation section which calculates a test emission pattern for test recording for controlling the power of a light beam which is output from the laser light source 1 based on the test clock signal. Moreover, the test pattern calculation section 24 outputs a signal for masking to the sample signal generation section 15.

In FIG. 9, the light amount detection section 2 receives a light beam from the laser light source 1, and sends a power detection signal which is in accordance with the power of the light beam to the sample-hold section 10. To the sample-hold section 10, the sample signal generation section 15 sends a sampling timing for acquiring each power of the light beam. The sample-hold section 10 samples the signal from the light amount detection section 2 based on a sampling signal from the sample signal generation section 15, and sends each hold signal to the power calculation section 11. Based on each hold signal from the sample-hold section 10, the power calculation section 11 calculates each detected power of the light beam, and sends it to the current calculation section 12. Based on each detected power of the light beam as calculated by the power calculation section 11, the current calculation section 12 calculates each current to be supplied to the laser light source 1, and sends it to the laser driver 13.

The address detection section 30 detects address information of a spot position of the light beam radiated on the optical disk, and sends it to the x-speed detection section 40. Based on the address information from the address detection section 30, the x-speed detection section 40 detects which x-speed it is, and sends it to the recording clock generation section 41.

Based on the x-speed information from the x-speed detection section 40, the recording clock generation section 41 generates a recording clock signal, and sends it to the test pattern calculation section 24 and the recording pattern calculation section 21. The recording data generation section 20 generates data to be recorded, and sends it to the recording pattern calculation section 21. In order to record the data from the recording data generation section 20, the recording pattern calculation section 21 calculates a data recording emission pattern on the basis of the recording clock signal from the recording clock generation section 41, and sends it to the pattern selector 25.

The test clock generation section 42 generates a test clock signal of a fixed frequency, and sends it to the test pattern calculation section 24. The test data generation section 22 generates data to be test-recorded, and sends it to the test pattern calculation section 24. The test pattern calculation section 24 calculates a test emission pattern on the basis of the recording clock signal from the recording clock generation section 41, and sends it to the pattern selector 25, so as to cause emission of the laser light source 1 based on the test data. When outputting multipulses within the test emission pattern, the test pattern calculation section 24 generates multipulses based on the test clock signal from the test clock generation section 42.

Based on the optical disk format, the pattern selector 25 selects a data recording emission pattern from the recording pattern calculation section 21 while in a data area, or selects a test emission pattern from the test pattern calculation section 24 while in a test area, and sends it to the laser driver 13. To the emission pattern from the pattern selector 25, the laser driver 13 adds each current from the current calculation section 12, and sends it to the laser light source 1. The laser light source 1 emits light in accordance with the current from the laser driver 13.

Figure 10:
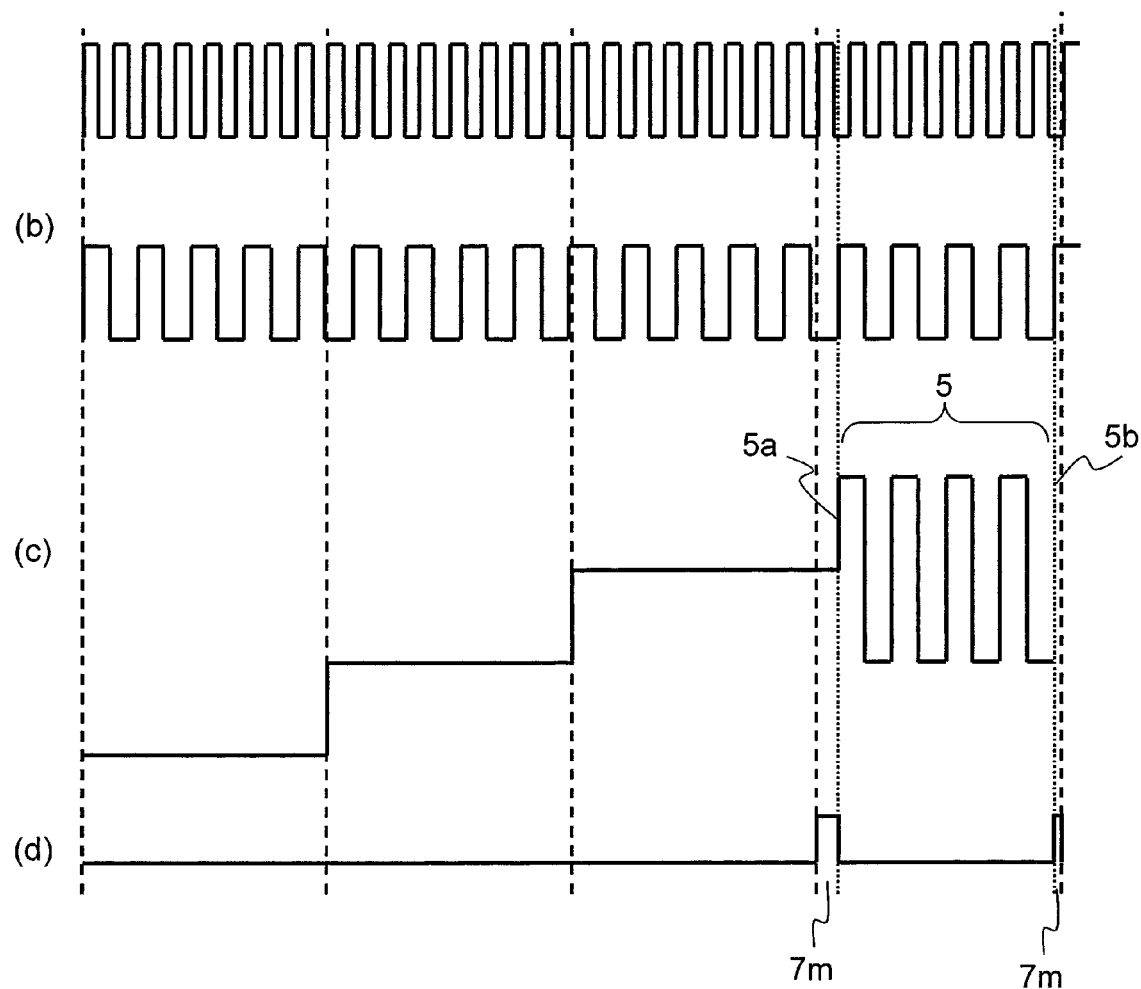
FIG. 10($a$) is a diagram showing an exemplary recording clock signal according to Embodiment 3 of the present invention; ($b$) is a diagram showing an exemplary test clock signal according to Embodiment 3 of the present invention; ($c$) is a diagram showing an exemplary test emission pattern signal according to Embodiment 3 of the present invention; and (d) is a diagram showing an exemplary mask signal which is output from a test pattern calculation section to a sample signal generation section according to Embodiment 3 of the present invention.

FIG. 10 shows an exemplary operation of the test pattern calculation section 24. A cooling level, a space level, a mark level, and a peak level are sent from the test data generation section 22 in this order. The test pattern calculation section 24 keeps counts of the recording clock from the recording clock generation section 41 shown in FIG. 10(*a*), and switches between the four emission patterns so as to be at equal intervals. In the portion of the peak level as shown in FIG. 10(*c*), the test pattern calculation section 24 generates multipulses 5 by combining the peak level and the space level. The test pattern calculation section 24 uses the test clock signal from the test clock generation section 42 shown in FIG. 10(*b*) when generating the multipulses.

Note that the recording clock signal from the recording clock generation section 41 and the test clock signal from the test clock generation section 42 are asynchronous, and thus their edge positions do not coincide. Therefore, the H periods and the L periods of the generated multipulses are not guaranteed to be equal. This results in a possibility that the detection accuracy of the multi-pulse average value may be deteriorated.

In order to prevent deterioration of the detection accuracy of the multi-pulse average value, it is necessary to ensure that the H periods and the L periods of the multipulses are equal. By masking the multipulses with a mask signal 7*m* shown in FIG. 10(*d*), the H periods and the L periods of the multipulses are made equal, whereby deteriorations in the detection accuracy of the multi-pulse average value can be suppressed. In order to mask at least one of a beginning 5*a* and an end 5*b* of the multipulsed portion 5 in the test emission pattern, the test pattern calculation section 24 outputs the mask signal 7*m* to the sample signal generation section 15. The sample-hold section 10 masks the sampling timing so that sampling does not occur at any timing to be masked that is acquired from the test pattern calculation section 24.

The time during which multipulses are emitted becomes shorter, and therefore the sampling timing for multi-pulse average value detection is masked by using the mask signal 7*m* shown in FIG. 10(*d*). By masking the sampling timing, it is ensured that sampling does not occur in a period where multipulses are not emitted, so that a stable multi-pulse average value can be acquired.

FIG. 11 shows test emission patterns at the respective x-speeds from 4× to 8×. As the x-speed becomes higher, the frequency of the recording clock signal from the recording clock generation section 41 is increased, but irrespectively, the test clock signal from the test clock generation section 42 is generated at a constant fixed frequency. That is, the test clock generation section 42 generates a test clock signal of a constant frequency, irrespectively of the linear velocity at recording. Therefore, as shown in FIG. 6(*a*), FIG. 6(*b*), FIG. 6(*c*), FIG. 6(*d*), and FIG. 6(*e*), the multipulse frequencies at all x-speeds are made equal. This makes it possible to perform recording at a high x-speed while maintaining a high accuracy of average value detection of the multipulses.

Thus, by generating a test clock signal for special use in the test areas separately from the recording clock signal from the recording clock generation section 41, and by using the test clock signal with respect to the multipulses for test emission, changes in the frequency of multipulse emission by the laser light source 1 in the test areas can be suppressed, so that deteriorations in the detection accuracy of the multi-pulse average value can be suppressed and deteriorations in the accuracy of laser power control of the peak power can be suppressed.

Although the multipulses for test emission are disposed at the end of the test emission pattern, they may be disposed in the middle of the test emission pattern, etc., so that they are not likely to affect data recording. The test pattern calculation section may set a pattern such that the beginning portion and the end portion of the test emission pattern are not multipulses. As a result, edge disorders at the time of switching the recording clock signal and the test clock signal are prevented from affecting the multipulses.

Although the proportion of the multipulses during test emission is illustrated as constant, the proportion of the multipulses may be increased in order to prevent deteriorations in the detection accuracy due to the multipulse emission time becoming shorter with increasing x-speeds.

Moreover, multipulses may be used for test emission regardless of whether multipulses exist in the emission pattern at data recording or not.

Although an operation based on ZCLV or PCAV is illustrated, the same is also applicable to other operation states such as FULLCLV and FULLCAV.

Although it is illustrated that an average value of multipulses is detected in order to detect a peak power, a peak level of multipulses may also be detected.

Although it is illustrated that the multipulses at test emission are multipulses which combine the peak power and the space power, multipulses may also be formed by any combination other than a combination of the peak power and the space power.

Although the present invention is applied to changes in the frequency of the recording clock signal from the recording clock generation section 41 that are associated with changes in the x-speed, the present invention may be applied to changes in the frequency of the recording clock signal due to differences in medium types.

INDUSTRIAL APPLICABILITY

The present invention is particularly useful in a technological field where, when performing recording or reproduction for an optical disk which is capable of recording, laser power control is performed by allowing a test emission including multipulses to be conducted in a test area.

REFERENCE SIGNS LIST

1 laser
2 light amount detection section
3 current adjustment section
10 sample-hold
11 power calculation section
12 current calculation section
13 laser driver
14 sample signal generation section
15 sample signal generation section
20 recording data generation section
21 recording pattern calculation section
22 test data generation section
23, 24 test pattern calculation section
25 pattern selector
30 address detection section
40 x-speed detection section
41 recording clock generation section
42 test clock generation section
43 frequency region designation section
44 frequency division setting section
50 frequency division section
60 peak calculation section
61 peak power conversion section
62 mark power conversion section
63 space power conversion section
64 cooling power conversion section
70 peak target generation section
71 mark target generation section
72 space target generation section
73 cooling target generation section
74 peak current integration section
75 mark current integration section
76 space current integration section
77 cooling current integration section
78 proportional retention section
79 proportional calculation section
80 control selector
100, 200 optical disk apparatus

The invention claimed is:

1. An optical disk apparatus comprising:
an emission section for outputting a light beam to be radiated on an information medium;
a current adjustment section for detecting a light amount of the light beam and adjusting a current to be supplied to the emission section;
a recording clock generation section for generating a recording clock signal to serve as a reference at data recording;
a frequency division section for dividing the recording clock signal to generate a divided clock signal;
a recording pattern calculation section for setting a data recording emission pattern based on the recording clock signal, the data recording emission pattern being for recording data;
a test pattern calculation section for setting a test emission pattern for test recording based on the divided clock signal, the test emission pattern being for controlling a power of the light beam which is output from the emission section; and
a current output section for supplying a current to the emission section based on an emission pattern which is selected from between the data recording emission pattern and the test emission pattern and on a current value which is calculated by the current adjustment section, wherein,
when a linear velocity at recording changes, the frequency division section adjusts a division ratio in a direction of reducing a change in frequency of the divided clock signal.

2. The optical disk apparatus of claim 1, further comprising a velocity detection section for detecting the linear velocity, wherein
the frequency division section adjusts the division ratio based on the detected linear velocity.

3. The optical disk apparatus of claim 2, wherein the velocity detection section detects the linear velocity based on an address on the information medium.

4. The optical disk apparatus of claim 2, wherein the velocity detection section detects the linear velocity based on a wobble frequency of a track on the information medium.

5. The optical disk apparatus of claim 2, wherein the velocity detection section detects the linear velocity based on a radial position on the information medium at which the light beam is radiated.

6. The optical disk apparatus of claim 1, wherein the frequency division section adjusts the division ratio based on the recording clock signal.

7. The optical disk apparatus of claim 1, wherein the frequency division section adjusts the division ratio based on the divided clock signal.

8. The optical disk apparatus of claim 1, wherein, when performing recording by a CLV method, the frequency division section ensures that the frequency of the divided clock signal is constant.

9. The optical disk apparatus of claim 1, wherein, when performing recording by a CAV method, the frequency division section ensures that the frequency of the divided clock signal is within a predetermined frequency range by changing the division ratio according to a radial position on the information medium at which the light beam is radiated.

10. The optical disk apparatus of claim 1, wherein the current adjustment section includes:
   a light amount detection section for detecting the power of the light beam which is output from the emission section and generating a power detection signal;
   a sample-hold section for detecting a plurality of levels of signals by sampling the power detection signal at different timings;
   a power calculation section for calculating a plurality of powers of the light beam based on output signals from the sample-hold section; and
   a current calculation section for calculating the current to be supplied to the emission section based on the plurality of calculated powers, wherein,
   the current calculation section possesses a non-detection scheme for, based on a power value other than a highest power value that is calculated by the power calculation section, calculating a current corresponding to the highest power value; and
   at any linear velocity other than the reference linear velocity, the current calculation section calculates a current corresponding to the highest power value by using the non-detection scheme.

11. The optical disk apparatus of claim 10, wherein the current calculation section possesses a detection scheme for calculating a current corresponding to the highest power by using a highest detected power value calculated by the power calculation section, wherein
   at the reference linear velocity, the current calculation section calculates a current corresponding to the highest power value by using the detection scheme.

12. The optical disk apparatus of claim 11, wherein the current calculation section chooses a linear velocity which is defined according to specifications of the information medium as a reference linear velocity.

13. The optical disk apparatus of claim 11, wherein when performing recording by a CAV method, the current calculation section chooses a linear velocity at an innermost periphery of the information medium as a reference linear velocity.

14. The optical disk apparatus of claim 1, wherein the frequency division section calculates a frequency range of the divided clock signal based on difference between an average power and a middle power at multipulse emission.

15. The optical disk apparatus of claim 1, wherein the frequency division section calculates a frequency range of the divided clock signal based on a frequency band of pulses of a light beam detectable to the current adjustment section.

16. The optical disk apparatus of claim 1, wherein the test pattern calculation section increases a proportion of multipulses occupied in the test emission pattern as the linear velocity increases.

17. The optical disk apparatus of claim 1, wherein the test pattern calculation section allows multipulses to be included in the test emission pattern even when the data recording emission pattern does not include multipulses.

18. A laser power controlling method comprising:
   a recording clock generation step of generating a recording clock signal to serve as a reference at data recording;
   a frequency division step of dividing the recording clock signal to generate a divided clock signal;
   a recording pattern calculation step of setting a data recording emission pattern based on the recording clock signal, the data recording emission pattern being for recording data;
   a test pattern calculation step of setting a test emission pattern for test recording based on the divided clock signal, the test emission pattern being for controlling a power of a light beam; and
   a current outputting step of supplying a current to an emission section based on an emission pattern which is selected from between the data recording emission pattern and the test emission pattern, wherein,
   the frequency division step includes a step of adjusting a division ratio in a direction of reducing a change in frequency of the divided clock signal when a linear velocity at recording changes.

* * * * *